(12) United States Patent
Gao et al.

(10) Patent No.: US 12,200,698 B2
(45) Date of Patent: Jan. 14, 2025

(54) TRANSMISSION METHOD FOR HYBRID AUTOMATIC REPEAT REQUEST FEEDBACK INFORMATION, NETWORK DEVICE AND TERMINAL

(71) Applicant: DATANG MOBILE COMMUNICATIONS EQUIPMENT CO., LTD., Beijing (CN)

(72) Inventors: Xuejuan Gao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 671 days.

(21) Appl. No.: 17/422,112

(22) PCT Filed: Dec. 27, 2019

(86) PCT No.: PCT/CN2019/129105
§ 371 (c)(1),
(2) Date: Jul. 9, 2021

(87) PCT Pub. No.: WO2020/143478
PCT Pub. Date: Jul. 16, 2020

(65) Prior Publication Data
US 2022/0116970 A1 Apr. 14, 2022

(30) Foreign Application Priority Data

Jan. 11, 2019 (CN) .......................... 201910028426.0

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
CPC . H04W 72/23; H04W 72/0446; H04W 72/21; H04W 72/20; H04W 72/04;
(Continued)

(56) References Cited

U.S. PATENT DOCUMENTS

2011/0134813 A1\* 6/2011 Park ...................... H04L 1/1854
370/280
2019/0150181 A1 5/2019 Kim et al.
(Continued)

FOREIGN PATENT DOCUMENTS

| CN | 107332646 A | 11/2017 |
|---|---|---|
| KR | 20180136907 A | 12/2018 |
| WO | 2018080212 A2 | 5/2018 |

OTHER PUBLICATIONS

Sony, Layer1 enhancement for URLLC, R1-1810639, 3GPP TSG RAN WG1 Meeting #94bis, Chengdu, China, Oct. 8-12, 2018, all pages.
(Continued)

*Primary Examiner* — Kwasi Karikari
(74) *Attorney, Agent, or Firm* — Ladas & Parry, LLP

(57) ABSTRACT

The present disclosure provides in some embodiments a transmission method for HARQ feedback information, a network device and a terminal. The method includes: determining a transmission position of an HARQ-ACK in accordance with a transmission position of downlink transmission and feedback timing of the HARQ-ACK for the downlink transmission, granularity of the feedback timing being smaller than one slot; and receiving the HARQ-ACK at the transmission position of the HARQ-ACK.

16 Claims, 4 Drawing Sheets

(51) Int. Cl.
  *H04L 5/00*       (2006.01)
  *H04L 27/26*      (2006.01)
  *H04W 72/0446*    (2023.01)
  *H04W 72/23*      (2023.01)
  *H04W 76/34*      (2018.01)

(52) U.S. Cl.
  CPC ... *H04L 27/26025* (2021.01); *H04W 72/0446* (2013.01); *H04W 72/23* (2023.01); *H04W 76/34* (2018.02)

(58) Field of Classification Search
  CPC ......... H04W 72/0453; H04W 72/1268; H04W 92/18; H04W 72/1273; H04W 24/10; H04W 74/0833; H04W 72/12; H04W 76/27; H04W 16/28; H04W 72/046; H04W 72/232; H04W 16/14; H04W 80/02; H04W 56/00; H04W 72/40; H04W 72/11; H04W 28/20; H04W 74/04; H04W 16/02; H04L 5/0053; H04L 5/0055; H04L 1/1812; H04L 5/0094; H04L 1/1861; H04L 5/0048
  See application file for complete search history.

(56) References Cited

U.S. PATENT DOCUMENTS

2019/0159251 A1    5/2019  Li et al.
2019/0260546 A1*   8/2019  Kilinc .................. H04W 72/51

OTHER PUBLICATIONS

Ericsson, "Scheduling/HARQ/CSI Processing Timeline Enhancements for NR URLLC", R1-1812156, 3GPP TSG-RAN WG1 Meeting #95, Spokane, USA, Nov. 12-16, 2018, all pages.

Huawei, HiSilicon, "HARQ enhancements in NR unlicensed", R1-1812196, 3GPP TSG RAN WG1 Meeting #95, Spokane, USA, Nov. 12-16, 2018, all pages.

Huawei, HiSilicon, "Enhancements to scheduling/HARQ/CSI processing timeline for URLLC", R1-1812224, 3GPP TSG RAN WG1 Meeting #95, Spokane, USA, Nov. 12-16, 2018, all pages.

Fujitsu, "Draft CR on Maintenance of HARQ-ACK transmission", R1-1812445, 3GPP TSG RAN WG1 Meeting 95, Spokane, USA, Nov. 12-1, 2018, all pages.

CATT, "UL control enhancements for URLLC", R1-1812629, 3GPP TSG RAN WG1 Meeting #95, Spokane, USA, Nov. 12-16, 2018, all pages.

Sony, "L1 enhancement on UCI for URLLC", R1-1812743, 3GPP TSG RAN WG1 Meeting #95, Spokane, USA, Nov. 12-16, 2018, all pages.

International Search Report from PCT/CN2019/129105, dated Mar. 26, 2020, with English translation from WIPO, all pages.

Written Opinion of the International Searching Authority from PCT/CN2019/129105, dated Mar. 26, 2020, with English translation from WIPO, all pages.

International Preliminary Report on Patentability from PCT/CN2019/129105, dated Jun. 16, 2021, with English translation from WIPO, all pages.

First Office Action and Search Report from TW app. No. 108148354, dated Dec. 30, 2021, with machine English translation, all pages.

Supplementary European Search Report for European Patent Application EP 19908657.0 issued on Feb. 25, 2022.

"UL control enhancements for URLLC" 3GPP TSG RAN WG1 Meeting #95, R1-1812385, Spokane, USA, Nov. 12-16, 2018, Source: ZTE, Agenda Title: 7.2.6.1.2.

"UCI Enhancements for eURLLC" 3GPP TSG-RAN WG1 #95, R1-1813434, Spokane, USA, Nov. 12-16, 2018, Source: ZTE, Agenda Title: 7.2.6.1.2.

* cited by examiner

TRANSMISSION METHOD FOR HYBRID AUTOMATIC REPEAT REQUEST FEEDBACK INFORMATION, NETWORK DEVICE AND TERMINAL

CROSS-REFERENCE TO RELATED APPLICATIONS

The present application is the U.S. national phase of PCT Application No. PCT/CN2019/129105 filed on Dec. 27, 2019, which claims a priority of the Chinese patent application 201910028426.0 filed on Jan. 11, 2019, the disclosures of which are incorporated herein by reference in their entireties.

TECHNICAL FIELD

The present disclosure relates to the field of communication technology, in particular to a transmission method for Hybrid Automatic Repeat reQuest (HARD) feedback information, a network device and a terminal.

BACKGROUND

Along with the development and change in the demand for mobile communication services, with respect to a future mobile communication system, many organizations, e.g., International Telecommunication Union (ITU), have started to study a new ratio communication system (i.e., a $5^{th}$-Generation (5G) New Radio Access Technology (RAT) (5G NR)). Flexible timing is supported in the 5G NR.

For a Physical Downlink Shared Channel (PDSCH), a Physical Downlink Control Channel (PDCCH) carrying its scheduling information indicates scheduling timing (i.e., K0) between the PDSCH and the PDCCH) and HARQ-Acknowledgement (ACK) timing (i.e., K1) between the PDSCH and a corresponding HARQ-ACK).

To be specific, a slot offset K0 between a slot where the PDSCH is located and a slot where Downlink Control Information (DCI) is located is indicated through a time-domain resource assignment indicator field in a DCI format used by the PDCCH.

The quantity K1 of slots between the end of the PDSCH and the beginning of the HARQ-ACK is indicated by a PDSCH-to-HARQ-ACK timing indicator field in the DCI format, i.e., the PDSCH transmitted within a slot is used to transmit the HARQ-ACK within a slot n+K1.

As shown in FIG. 1, a universal set of K1 is {0, 1, 2, 3, 4, 5, 6, 7, 8, 9, 10, 11, 12, 13, 14, 15}, and usually at most 8 values are configured for a terminal. A value of K1 is in unit of slot, i.e., K1=1 represents that an interval is one slot.

When the transmission of an Ultra-Reliable Low Latency Communications (URLLC) service is supported, a lower transmission latency is required.

Hence, the definition about granularity of a feedback latency which is smaller than one slot, e.g., a half slot or a quarter slot, has been proposed.

When the granularity of the feedback latency has been reduced, no change occurs for the scheduling of the PDSCH transmission, i.e., K0 is still in unit of slot. At this time, there is no definite method for determining a transmission position of the HARQ-ACK corresponding to the PDSCH in accordance with a transmission position of the PDSCH and K1.

SUMMARY

An object of the present disclosure is to provide a transmission method for HARQ feedback information, a network device and a terminal, so as to solve the problem about how to perform HARQ-ACK feedback when granularity of the HARQ-ACK timing between downlink transmission and the transmission of the HARQ-ACK changes.

In order to solve the above problem, the present disclosure provides the following technical solutions.

In one aspect, the present disclosure provides in some embodiments a transmission method for HARQ feedback information realized by a network device, including: determining a transmission position of an HARQ-ACK in accordance with a transmission position of downlink transmission and feedback timing of the HARQ-ACK for the downlink transmission, granularity of the feedback timing being smaller than one slot; and receiving the HARQ-ACK at the transmission position of the HARQ-ACK.

In some possible embodiments of the present disclosure, the determining the transmission position of the HARQ-ACK includes, when the transmission position of the downlink transmission is a slot n, determining the transmission position of the HARQ-ACK as a slot n+⌈K1/N⌉, where K1 represents a value of the feedback timing of the HARQ-ACK and it is an integer, the granularity of the feedback timing is 1/N slot, and N is a predetermined integer greater than 1.

In some possible embodiments of the present disclosure, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot n+⌈K1/N⌉; when K1>0 and (K1−1) mod N=i, the HARQ-ACK is transmitted in an $(i+1)^{th}$ part, an $(i+1)^{th}$ mini-slot, or a mini-slot with an index of i within N parts of the slot n+⌈K1/N⌉; or when (K1+N−1) mod N=i, the HARQ-ACK is transmitted in the $(i+1)^{th}$ part the $(i+1)^{th}$ mini-slot or the mini-slot with an index of i within N parts of the slot n+⌈K1/N⌉, where i=0, 1, 2, ..., N−1, and the N parts are N parts not overlapping each other and acquired through dividing one slot in a chronological order or an ascending order of indices of Orthogonal Frequency Division Multiplexing (OFDM) symbols, or N mini-slots within one slot.

In some possible embodiments of the present disclosure, the determining the transmission position of the HARQ-ACK includes, when the transmission position of the downlink transmission is a slot n, determining the transmission position of the HARQ-ACK as a slot n+⌊K1/N⌋, where K1 represents a value of the feedback timing of the HARQ-ACK and it is an integer, the granularity of the feedback timing is 1/N slot, and N is a predetermined integer greater than 1.

In some possible embodiments of the present disclosure, when K1 mod N=i, the HARQ-ACK is transmitted in an $(i+1)^{th}$ part, an $(i+1)^{th}$ mini-slot or a mini-slot with an index of i within N parts of the slot n+⌊K1/N⌋ where i=0, 1, 2, ..., N−1, and the N parts are N parts not overlapping each other and acquired through dividing one slot in a chronological order or an ascending order of indices of OFDM symbols, or N mini-slots within one slot.

In some possible embodiments of the present disclosure, the determining the transmission position of the HARQ-ACK includes, when the transmission position of the downlink transmission is a slot n, determining the transmission position of the HARQ-ACK as a slot ⌈n+K1⌉ or n+⌈K1⌉, where K1 represents a value of the feedback timing of the HARQ-ACK and it is an integral multiple of 1/N, the granularity of the feedback timing is 1/N slot, and N is a predetermined integer greater than 1.

In some possible embodiments of the present disclosure, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot ⌈n+K1⌉ or ⌈K1⌉; when K1>0 and (K1*N−1) mod N=i, the HARQ-ACK is transmitted in an $(i+1)^{th}$ part, an $(i+1)^{th}$ mini-slot, or a mini-slot with an index of i within N parts of the slot ⌈n+K1⌉ or n+⌈K1⌉; or when (K1*N+N−1) mod N=i, the HARQ-ACK is transmitted in the (i+1)th part, the (i+1)th mini-slot or the mini-slot with an index of i within N parts of the slot ⌈n+K1⌉ or n+⌈K1⌉, where i=0, 1, 2, . . . , N−1, and the N parts are N parts not overlapping each other and acquired through dividing one slot in a chronological order or an ascending order of indices of OFDM symbols, or N mini-slots within one slot.

In some possible embodiments of the present disclosure, the determining the transmission position of the HARQ-ACK includes, when the transmission position of the downlink transmission is a slot n, determining the transmission position of the HARQ-ACK as a slot ⌊n+K1⌋ or n+⌊K1⌋ where K1 represents a value of the feedback timing of the HARQ-ACK and it is an integral multiple of 1/N, the granularity of the feedback timing is 1/N slot, and N is a predetermined integer greater than 1.

In some possible embodiments of the present disclosure, when (K1*N) mod N=i, the HARQ-ACK is transmitted in an $(i+1)^{th}$ part, an $(i+1)^{th}$ mini-slot or a mini-slot with an index of i within N parts of the slot ⌊n+K1⌋ or n+⌊K1⌋ where i=0, 1, 2, . . . , N−1, and the N parts are N parts not overlapping each other and acquired through dividing one slot in a chronological order or an ascending order of indices of OFDM symbols, or N mini-slots within one slot.

In some possible embodiments of the present disclosure, the determining the transmission position of the HARQ-ACK includes, when the transmission position of the downlink transmission is a slot n, determining the transmission position of the HARQ-ACK as a mini-slot n*N+K1, where N represents the quantity of mini-slots within one slot.

In some possible embodiments of the present disclosure, when the mini-slot index n*N+K1 of the mini-slot is greater than a maximum mini-slot index within a radio frame, the mini-slot index is (n*N+K1) mod T, where T represents the quantity of mini-slots in the radio frame.

In some possible embodiments of the present disclosure, the downlink transmission includes the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

In some possible embodiments of the present disclosure, when a Sub-Carrier Spacing (SCS) of a Physical Uplink Control Channel (PUCCH) carrying the HARQ-ACK is different from an SCS of the downlink transmission, n is replaced with a reference index ñ determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases},$$

where, $\mu_{PUCCH}$ represents an index corresponding to the SCS of the PUCCH, and $\mu_{PDSCH}$ represents an index corresponding to the SCS of the downlink transmission; or a position corresponding to K1=0 is defined as a slot for PUCCH transmission comprising the downlink transmission, a last slot for PUCCH transmission comprising the downlink transmission, or a first slot for PUCCH transmission comprising the downlink transmission.

In another aspect, the present disclosure provides in some embodiments a transmission method for HARQ feedback information realized by a terminal, including: determining a transmission position of an HARQ-ACK in accordance with a transmission position of downlink transmission and feedback timing of the HARQ-ACK for the downlink transmission, granularity of the feedback timing being smaller than one slot; and transmitting the HARQ-ACK at the transmission position of the HARQ-ACK.

In some possible embodiments of the present disclosure, the determining the transmission position of the HARQ-ACK includes, when the transmission position of the downlink transmission is a slot n, determining the transmission position of the HARQ-ACK as a slot n+⌈K1/N⌉, where K1 represents a value of the feedback timing of the HARQ-ACK and it is an integer, the granularity of the feedback timing is 1/N slot, and N is a predetermined integer greater than 1.

In some possible embodiments of the present disclosure, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot n+⌈K1/N⌉; when K1>0 and (K1−1) mod N=i, the HARQ-ACK is transmitted in an $(i+1)^{th}$ part, an $(i+1)^{th}$ mini-slot, or a mini-slot with an index of i within N parts of the slot n+⌈K1/N⌉; or when (K1+N−1) mod N=i, the HARQ-ACK is transmitted in the $(i+1)^{th}$ part, the $(i+1)^{th}$ mini-slot or the mini-slot with an index of i within N parts of the slot n+⌈K1/N⌉, where i=0, 1, 2, . . . , N−1, and the N parts are N parts not overlapping each other and acquired through dividing one slot in a chronological order or an ascending order of indices of OFDM symbols, or N mini-slots within one slot.

In some possible embodiments of the present disclosure, the determining the transmission position of the HARQ-ACK includes, when the transmission position of the downlink transmission is a slot n, determining the transmission position of the HARQ-ACK as a slot n+⌊K1/N⌋, where K1 represents a value of the feedback timing of the HARQ-ACK and it is an integer, the granularity of the feedback timing is 1/N slot, and N is a predetermined integer greater than 1.

In some possible embodiments of the present disclosure, when K1 mod N=i, the HARQ-ACK is transmitted in an $(i+1)^{th}$ part, an $(i+1)^{th}$ mini-slot or a mini-slot with an index of i within N parts of the slot n+⌊K1/N⌋, where i=0, 1, 2, . . . , N−1, and the N parts are N parts not overlapping each other and acquired through dividing one slot in a chronological order or an ascending order of indices of OFDM symbols, or N mini-slots within one slot.

In some possible embodiments of the present disclosure, the determining the transmission position of the HARQ-ACK includes, when the transmission position of the downlink transmission is a slot n, determining the transmission position of the HARQ-ACK as a slot ⌈n+K1⌉ or n+⌈K1⌉, where K1 represents a value of the feedback timing of the HARQ-ACK and it is an integral multiple of 1/N, the granularity of the feedback timing is 1/N slot, and N is a predetermined integer greater than 1.

In some possible embodiments of the present disclosure, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot $\lceil n+K1 \rceil$ or $n+\lceil K1 \rceil$; when K1>0 and (K1*N−1) mod N=i, the HARQ-ACK is transmitted in an $(i+1)^{th}$ part, an $(i+1)^{th}$ mini-slot, or a mini-slot with an index of i within N parts of the slot $\lceil n+K1 \rceil$ or $n+\lceil K1 \rceil$; or when (K1*N+N−1) mod N=i, the HARQ-ACK is transmitted in the (i+1)th part, the (i+1)th mini-slot or the mini-slot with an index of i within N parts of the slot $\lceil n+K1 \rceil$ or $n+\lceil K1 \rceil$, where i=0, 1, 2, . . . , N−1, and the N parts are N parts not overlapping each other and acquired through dividing one slot in a chronological order or an ascending order of indices of OFDM symbols, or N mini-slots within one slot.

In some possible embodiments of the present disclosure, the determining the transmission position of the HARQ-ACK includes, when the transmission position of the downlink transmission is a slot n, determining the transmission position of the HARQ-ACK as a slot $\lfloor n+K1 \rfloor$ or $n+\lfloor K1 \rfloor$ where K1 represents a value of the feedback timing of the HARQ-ACK and it is an integral multiple of 1/N, the granularity of the feedback timing is 1/N slot, and N is a predetermined integer greater than 1.

In some possible embodiments of the present disclosure, when (K1*N) mod N=i, the HARQ-ACK is transmitted in an $(i+1)^{th}$ part, an $(i+1)^{th}$ mini-slot or a mini-slot with an index of i within N parts of the slot $\lfloor n+K1 \rfloor$ or $n+\lfloor K1 \rfloor$ where i=0, 1, 2, . . . , N−1, and the N parts are N parts not overlapping each other and acquired through dividing one slot in a chronological order or an ascending order of indices of OFDM symbols, or N mini-slots within one slot.

In some possible embodiments of the present disclosure, the determining the transmission position of the HARQ-ACK includes, when the transmission position of the downlink transmission is a slot n, determining the transmission position of the HARQ-ACK as a mini-slot n*N+K1, where N represents the quantity of mini-slots within one slot.

In some possible embodiments of the present disclosure, when the mini-slot index n*N+K1 of the mini-slot is greater than a maximum mini-slot index within a radio frame, the mini-slot index is (n*N+K1) mod T, where T represents the quantity of mini-slots in the radio frame.

In some possible embodiments of the present disclosure, the downlink transmission includes the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

In some possible embodiments of the present disclosure, when an SCS of a PUCCH carrying the HARQ-ACK is different from an SCS of the downlink transmission, n is replaced with a reference index ñ determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases},$$

where $\mu_{PUCCH}$ represents an index corresponding to the SCS of the PUCCH, and $\mu_{PDSCH}$ represents an index corresponding to the SCS of the downlink transmission; or a position corresponding to K1=0 is defined as a slot for PUCCH transmission comprising the downlink transmission, a last slot for PUCCH transmission comprising the downlink transmission, or a first slot for PUCCH transmission comprising the downlink transmission.

In yet another aspect, the present disclosure provides in some embodiments a network device, including: a processing module configured to determine a transmission position of an HARQ-ACK in accordance with a transmission position of downlink transmission and feedback timing of the HARQ-ACK for the downlink transmission, granularity of the feedback timing being smaller than one slot; and a transceiver module configured to receive the HARQ-ACK at the transmission position of the HARQ-ACK.

In still yet another aspect, the present disclosure provides in some embodiments a terminal, including: a processing module configured to determine a transmission position of an HARQ-ACK in accordance with a transmission position of downlink transmission and feedback timing of the HARQ-ACK for the downlink transmission, granularity of the feedback timing being smaller than one slot; and a transceiver module configured to transmit the HARQ-ACK at the transmission position of the HARQ-ACK.

In still yet another aspect, the present disclosure provides in some embodiments a communication device, including a processor configured to: determine a transmission position of an HARQ-ACK in accordance with a transmission position of downlink transmission and feedback timing of the HARQ-ACK for the downlink transmission, and receive the HARQ-ACK at the transmission position of the HARQ-ACK; or determine a transmission position of an HARQ-ACK in accordance with a transmission position of downlink transmission and feedback timing of the HARQ-ACK for the downlink transmission, and transmit the HARQ-ACK at the transmission position of the HARQ-ACK. Granularity of the feedback timing is smaller than one slot.

In still yet another aspect, the present disclosure provides in some embodiments a computer-readable storage medium including an instruction. The instruction is executed by a computer to implement the above-mentioned methods.

The present disclosure has the following beneficial effect.

According to the embodiments of the present disclosure, when the granularity of the feedback timing of the HARQ-ACK has been reduced, appropriate HARQ-ACK timing may be determined in accordance with the transmission position of the downlink transmission and the feedback timing of the HARQ-ACK, so as to normally feed back the HARQ-ACK for the downlink transmission.

DETAILED DESCRIPTION

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Figure 1:
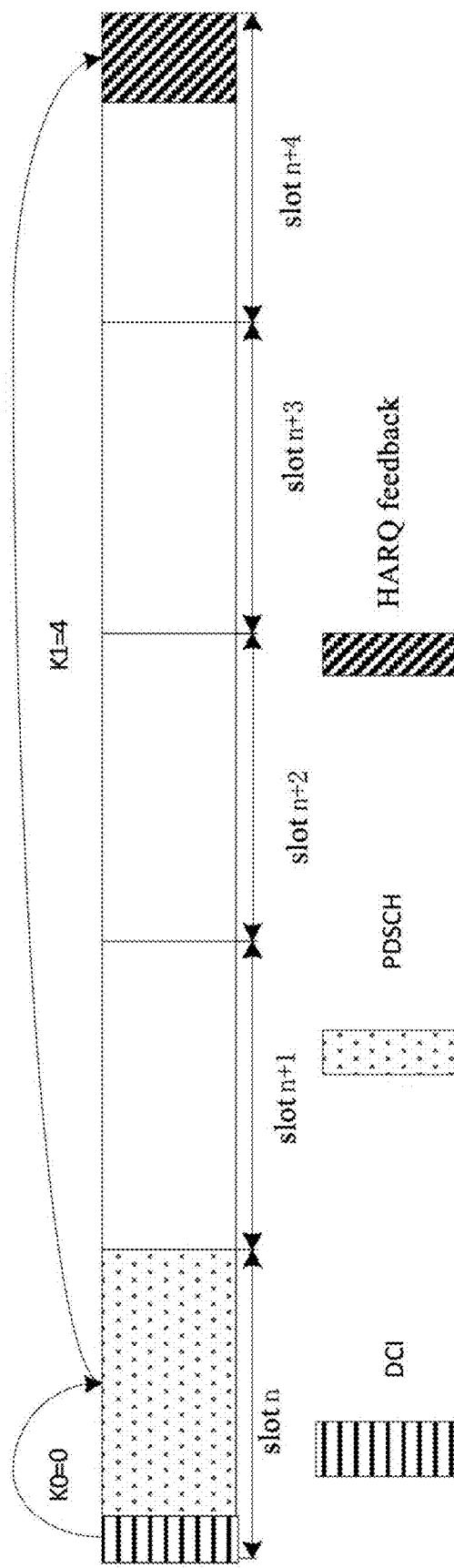
FIG. 1 is a schematic view showing a downlink scheduling sequence and feedback timing of an HARQ-ACK in the related art.
Figure 2:
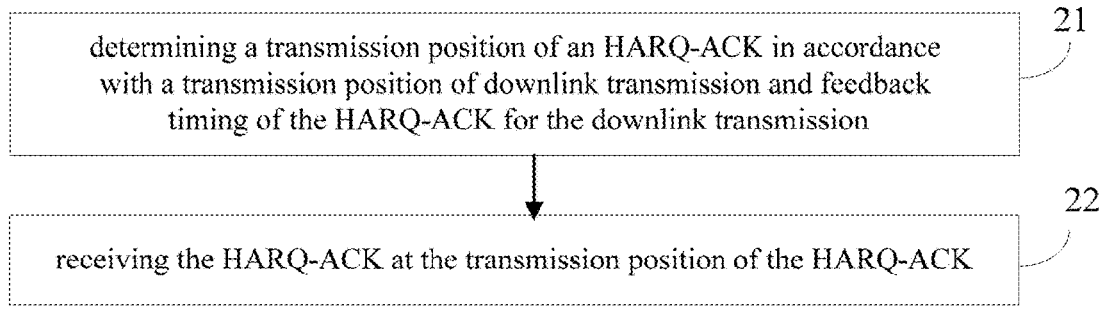
FIG. 2 is a flow chart of a transmission method for HARQ feedback information realized by a network device according to one embodiment of the present disclosure.

As shown in FIG. 2, the present disclosure provides in some embodiments a transmission method for HARQ feedback information realized by a network device, which includes the following steps.

Step 21: determining a transmission position of an HARQ-ACK in accordance with a transmission position of downlink transmission and feedback timing of the HARQ-ACK for the downlink transmission, granularity of the feedback timing being smaller than one slot. Here, the downlink transmission may include the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

Step 22: receiving the HARQ-ACK at the transmission position of the HARQ-ACK.

According to the embodiments of the present disclosure, when the granularity of the feedback timing of the HARQ-ACK has been reduced, appropriate HARQ-ACK timing may be determined in accordance with the transmission position of the downlink transmission and the feedback timing of the HARQ-ACK, so as to normally feed back the HARQ-ACK for the downlink transmission.

In a possible embodiment of the present disclosure, in a first implementation mode, Step 21 of determining the transmission position of the HARQ-ACK may include Step 211 of, when the transmission position of the downlink transmission is a slot n, determining the transmission position of the HARQ-ACK as a slot $n+\lceil K1/N \rceil$, where K1 represents a value of the feedback timing of the HARQ-ACK and it is an integer, the granularity of the feedback timing is 1/N slot, and N is a predetermined integer greater than 1.

Here, for example, K1 is $\{0, 1, 2, 3, 4, 5, 6, 7, 8 \ldots \}$, and N represents the quantity of basic units of the feedback timing within one slot, the quantity of mini-slots within one slot, or the quantity of mini-slots for transmitting a PUCCH within one slot. When K1 is 1, it represents a length of 1/N slot.

For example, when the basic unit of the feedback timing is a half slot, N=2, or when it is predefined that one slot includes 2 mini-slots or 2 mini-slots for transmitting the PUCCH, N=2. When N=2, K1=1 represents a length of a half slot, e.g., 7 symbols.

For another example, when the basic unit of the feedback timing is ¼ slot, N=4, or when it is predefined that one slot includes 4 mini-slots or 4 mini-slots for transmitting the PUCCH, N=4. When N=4, K1=1 represents a length of ¼ slot, e.g., 3 or 4 symbols. To be specific, whether one basic unit includes 3 or 4 symbols may be predefined or pre-configured. For example, a first PUCCH within one slot may have a basic unit with a length of 3 symbols, a second PUCCH may have a basic unit with a length of 4 symbols, a third PUCCH may have a basic unit with a length of 3 symbols, and a fourth PUCCH may have a basic unit with a length of 4 symbols. Of course, the lengths of the basic units for the PUCCHs may also be replaced with each other. For example, the first PUCCH may have a basic unit with a length of 4 symbols, the second PUCCH may have a basic unit with a length of 3 symbols, the third PUCCH may have a basic unit with a length of 3 symbols, and the fourth PUCCH may have a basic unit with a length of 4 symbols.

In the specific implementation of Step 211, a part of the determined slot where the HARQ-ACK is transmitted may be determined in the following modes.

Mode A: when K1=0, the HARQ-ACK may be transmitted in a first part, an $N^{th}$ part, a first mini-slot, an $N^{th}$ mini-slot, a mini-slot with an index of 0, or a mini-slot with an index of N−1 in N parts of the slot $n+\lceil K1/N \rceil$, and when K1>0 and (K1−1) mod N=i, the HARQ-ACK may be transmitted in an $(i+1)^{th}$ part, an $(i+1)^{th}$ mini-slot, or a mini-slot with an index of i in the N parts of the slot $n+\lceil K1/N \rceil$.

For example, when N=2, one slot may be divided into two parts, i.e., a first half slot and a second half slot. When K1=0, it may be determined that the HARQ-ACK is transmitted within the second half slot of the slot $n+\lceil K1/N \rceil$; when K1>0 and (K1−1) mod N=0, i.e., K1 is an odd number, it may be determined that the HARQ-ACK is transmitted with the first half slot of the slot $n+\lceil K1/N \rceil$; and when K1>0 and (K1−1) mod N=1, i.e., K1 is an even number, it may be determined that the HARQ-ACK is transmitted with the second half slot of the slot $n+\lceil K1/N \rceil$.

Mode B: when (K1+N−1) mod N=i, the HARQ-ACK may be transmitted in the $(i+1)^{th}$ part, the $(i+1)^{th}$ mini-slot or the mini-slot with an index of i in the N parts of the slot $n+\lceil K1/N \rceil$, where i=0, 1, 2, . . . , N−1, and the N parts are N parts not overlapping each other and acquired through dividing one slot in a chronological order or an ascending order of indices of OFDM symbols, or N mini-slots within one slot.

For example, when N=2, one slot may be divided into two parts, i.e., a first half slot and a second half slot.

When (K1+N−1) mod N=0, i.e., K1 is an odd number, it may be determined that the HARQ-ACK is transmitted within the first half slot of the slot $n+\lceil K1/N \rceil$.

When (K1+N−1) mod N=1, i.e., K1 is an even number, it may be determined that the HARQ-ACK is transmitted within the second half slot of the slot $n+\lfloor K1/N \rfloor$.

In a possible embodiment of the present disclosure, in a second implementation mode, Step 21 of determining the transmission position of the HARQ-ACK may include Step 212 of, when the transmission position of the downlink transmission is a slot n, determining the transmission position of the HARQ-ACK as a slot $n+\lfloor K1/N \rfloor$, where K1 represents a value of the feedback timing of the HARQ-ACK and it is an integer, the granularity of the feedback timing is 1/N slot, and N is a predetermined integer greater than 1.

Here, for example, K1 is $\{0, 1, 2, 3, 4, 5, 6, 7, 8 \ldots \}$, and N represents the quantity of basic units of the feedback timing within one slot, the quantity of mini-slots within one slot, or the quantity of mini-slots for transmitting a PUCCH within one slot. When K1 is 1, it represents a length of 1/N slot.

For example, when the basic unit of the feedback timing is a half slot, N=2, or when it is predefined that one slot includes 2 mini-slots or 2 mini-slots for transmitting the PUCCH, N=2. When N=2, K1=1 represents a length of a half slot, e.g., 7 symbols.

For another example, when the basic unit of the feedback timing is ¼ slot, N=4, or when it is predefined that one slot includes 4 mini-slots or 4 mini-slots for transmitting the PUCCH, N=4. When N=4, K1=1 represents a length of ¼ slot, e.g., 3 or 4 symbols. To be specific, whether one basic unit includes 3 or 4 symbols may be predefined or pre-configured. For example, a first PUCCH within one slot may have a basic unit with a length of 3 symbols, a second PUCCH may have a basic unit with a length of 4 symbols, a third PUCCH may have a basic unit with a length of 3 symbols, and a fourth PUCCH may have a basic unit with a length of 4 symbols. Of course, the lengths of the basic units for the PUCCHs may also be replaced with each other. For example, the first PUCCH may have a basic unit with a length of 4 symbols, the second PUCCH may have a basic unit with a length of 3 symbols, the third PUCCH may have a basic unit with a length of 3 symbols, and the fourth PUCCH may have a basic unit with a length of 4 symbols.

In the specific implementation of Step 212, a part of the determined slot where the HARQ-ACK is transmitted may be determined as follows.

When K1 mod N=i, the HARQ-ACK may be transmitted in an $(i+1)^{th}$ part, an $(i+1)^{th}$ mini-slot or a mini-slot with an index of i in N parts of the slot $n+\lfloor K1/N \rfloor$ where $i=0, 1, 2, \ldots, N-1$, and the N parts are N parts not overlapping each other and acquired through dividing one slot in a chronological order or an ascending order of indices of OFDM symbols, or N mini-slots within one slot.

For example, when N=2, one slot may be divided into two parts, i.e., a first half slot and a second half slot. When K1 mod N=0, i.e., when K1 is an even number, it may be determined that the HARQ-ACK is transmitted within the first half slot of the slot $n+\lfloor K1/N \rfloor$; and when K1 mod N=1, i.e., when K1 is an odd number, it may be determined that the HARQ-ACK is transmitted with the second half slot of the slot $n+\lfloor K1/N \rfloor$.

Figure 3:
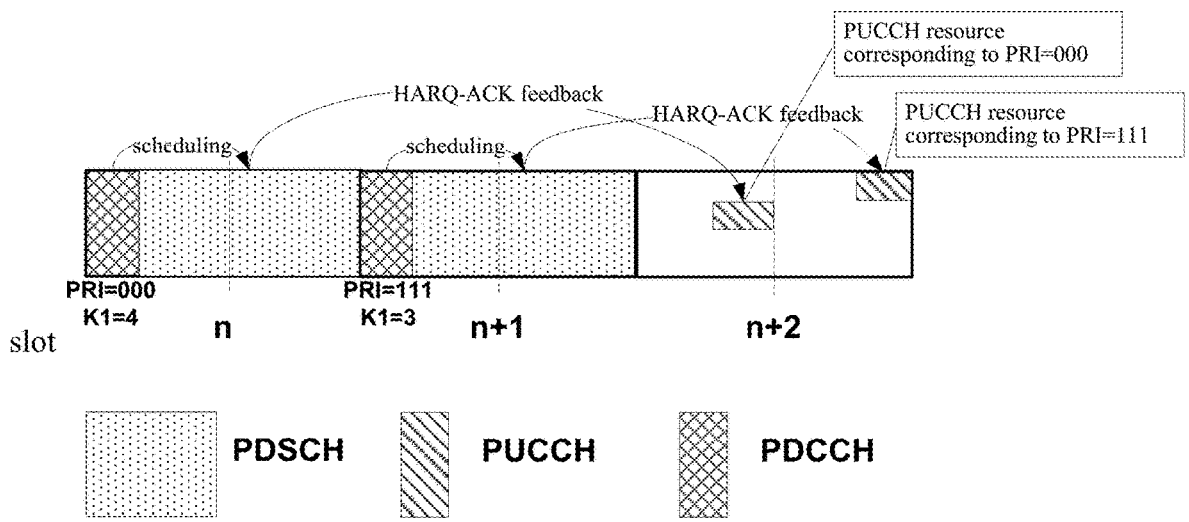
FIG. 3 is a schematic view showing feedback timing of an HARQ-ACK according to one embodiment of the present disclosure.

To be specific, in the second implementation mode for determining the transmission position of the HARQ-ACK, as shown in FIG. 3, it is presumed that K1 is an integer, K1=1 represents a length of a half slot, and it is defined that K1={2, 3, 4, 5}. At a terminal side, when a terminal has received one PDSCH within the slot n, the terminal may determine that an HARQ-ACK for the PDSCH is transmitted within the slot $n+\lfloor K1/N \rfloor$ in accordance with a value of K1 indicated by an HARQ-ACK timing indicator field in DCI used by a PDCCH for scheduling the PDSCH (PDSCH-to-HARQ-timing-indicator field).

For example, when K1=4 as indicated in the DCI, the terminal may determine that the HARQ-ACK for the PDSCH is transmitted within a slot $n+\lfloor K1/N \rfloor=n+2$. In addition, because K1 is an even number and K1 mod N=0, i.e., the HARQ-ACK for the PDSCH is transmitted within a first half slot within the slot n+2, the terminal may further determine one PUCCH resource in preconfigured PUCCH resources in accordance with a PUCCH resource indicator field in the DCI, and a starting symbol of the resource needs to be within the first half slot of the slot n+2. Hence, the terminal may transmit the HARQ-ACK for the PDSCH within the slot n on one PUCCH within the first half slot within the slot n+2.

When the terminal has received one PDSCH within a slot n+1, the terminal may determine that an HARQ-ACK for the PDSCH is transmitted within a slot $n+1+\lfloor K1/N \rfloor$ in accordance with a value of K1 indicated by an HARQ-ACK timing indicator field in DCI used by a PDCCH for scheduling the PDSCH (PDSCH-to-HARQ-timing-indicator field). For example, when K1=3 as indicated in the DCI, the terminal may determine that the HARQ-ACK for the PDSCH is transmitted within a slot $n+1+\lfloor K1/N \rfloor=n+2$. In addition, because K1 is an odd number and K1 mod N=1, i.e., the HARQ-ACK for the PDSCH is transmitted within a second half slot of the slot n+2, the terminal may further determine one PUCCH resource in preconfigured PUCCH resources in accordance with a PUCCH resource indicator field in the DCI, and a starting symbol of the resource needs to be within the second half slot of the slot n+2. Hence, the terminal may transmit the HARQ-ACK for the PDSCH within the slot n+1 on a PUCCH within the second half slot of the slot n+2.

At a base station side, like that mentioned hereinabove, a base station may determine that the HARQ-ACK for the PDSCH within the slot n is received on a PUCCH resource within the first half slot of the slot n+2 and the HARQ-ACK for the PDSCH within the slot n+1 is received on a PUCCH resource within the second half slot within the slot n+2.

In a possible embodiment of the present disclosure, in a third implementation mode, Step 21 of determining the transmission position of the HARQ-ACK may include Step 213 of, when the transmission position of the downlink transmission is a slot n, determining the transmission position of the HARQ-ACK as a slot $\lceil n+K1 \rceil$ or $n+\lceil K1 \rceil$, where K1 represents a value of the feedback timing of the HARQ-ACK and it is an integral multiple of 1/N, the granularity of the feedback timing is 1/N slot, and N is a predetermined integer greater than 1.

Here, for example, K1 is {0, 0.5, 1, 1.5, 2, 2.5, 3, 3.5, 4 . . . }, and N represents the quantity of basic units of the feedback timing within one slot, the quantity of mini-slots within one slot, or the quantity of mini-slots for transmitting a PUCCH within one slot. When K1 is 1/N, it represents a length of 1/N slot, and when K1 is 1, it presents a length of one slot.

For example, when the basic unit of the feedback timing is a half slot, N=2, or when it is predefined that one slot includes 2 mini-slots or 2 mini-slots for transmitting the PUCCH, N=2. When N=2, K1=0.5 represents a length of a half slot, e.g., 7 symbols.

For another example, when the basic unit of the feedback timing is ¼ slot, N=4, or when it is predefined that one slot includes 4 mini-slots or 4 mini-slots for transmitting the PUCCH, N=4. When N=4, K1=0.25 represents a length of ¼ slot, e.g., 3 or 4 symbols. To be specific, whether one basic unit includes 3 or 4 symbols may be predefined or pre-configured. For example, a first PUCCH within one slot may have a basic unit with a length of 3 symbols, a second PUCCH may have a basic unit with a length of 4 symbols, a third PUCCH may have a basic unit with a length of 3 symbols, and a fourth PUCCH may have a basic unit with a length of 4 symbols. Of course, the lengths of the basic units for the PUCCHs may also be replaced with each other. For example, the first PUCCH may have a basic unit with a length of 4 symbols, the second PUCCH may have a basic unit with a length of 3 symbols, the third PUCCH may have a basic unit with a length of 3 symbols, and the fourth PUCCH may have a basic unit with a length of 4 symbols.

In the specific implementation of Step 213, a part of the determined slot where the HARQ-ACK is transmitted may be determined in the following modes.

Mode C: when K1=0, the HARQ-ACK may be transmitted in a first part, an $N^{th}$ part, a first mini-slot, an $N^{th}$ mini-slot, a mini-slot with an index of 0, or a mini-slot with an index of N−1 in N parts of the slot ⌈n+K1⌉ or n+⌈K1⌉; and when K1>0 and (K1*N−1) mod N=i, the HARQ-ACK may be transmitted in an (i+1)$^{th}$ part, an (i+1)$^{th}$ mini-slot, or a mini-slot with an index of i in the N parts of the slot ⌈n+K1⌉ or n+⌈K1⌉.

For example, when N=2, one slot may be divided into two parts, i.e., a first half slot and a second half slot. When K1=0, the HARQ-ACK may be transmitted within the second half slot of the slot ⌈n+K1⌉ or n+⌈K1⌉. For example when one slot may be divided into two parts, i.e., a first half slot and a second half slot. When K1>0 and (K1*N−1) mod N=0, i.e., K1 is a decimal, it may be determined that the HARQ-ACK is transmitted with the first half slot of the slot ⌈n+K1⌉ or n+⌈K1⌉. When K1>0 and (K1*N−1) mod N=1, i.e., K1 is an integer, it may be determined that the HARQ-ACK is transmitted with the second half slot of the slot ⌈n+K1⌉ or n+⌈K1⌉.

Mode D: when (K1*N+N−1) mod N=i, the HARQ-ACK may be transmitted in the (i+1)$^{th}$ part, the (i+1)$^{th}$ mini-slot or the mini-slot with an index of i in the N parts of the slot ⌈n+K1⌉ or n+⌈K1⌉ where i=0, 1, 2, . . . , N−1 and the N parts are N parts not overlapping each other and acquired through dividing one slot in a chronological order or an ascending order of indices of OFDM symbols, or N mini-slots within one slot.

For example, when N=2, one slot may be divided into two parts, i.e., a first half slot and a second half slot.

When (K1*N+N−1) mod N=0, i.e., K1 is a decimal, it may be determined that the HARQ-ACK is transmitted within the first half slot of the slot ⌈n+K1⌉ or n+⌈K1⌉.

When (K1*N+N−1) mod N==1, i.e., K1 is an integer, it may be determined that the HARQ-ACK is transmitted within the second half slot of the slot ⌈n+K1⌉ or n+⌈K1⌉.

In a possible embodiment of the present disclosure, in a first implementation mode, Step 21 of determining the transmission position of the HARQ-ACK may include Step 214 of, when the transmission position of the downlink transmission is a slot n, determining the transmission position of the HARQ-ACK as a slot ⌊n+K1⌋ or n+⌊K1⌋, where K1 represents a value of the feedback timing of the HARQ-ACK and it is an integral multiple of 1/N, the granularity of the feedback timing is 1/N slot, and N is a predetermined integer greater than 1.

Here, for example, K1 is {0, 0.5, 1, 1.5, 2, 2.5, 3, 3.5, 4 . . . }, and N represents the quantity of basic units of the feedback timing within one slot, the quantity of mini-slots within one slot, or the quantity of mini-slots for transmitting a PUCCH within one slot. When K1 is 1/N, it represents a length of 1/N slot, and when K1 is 1, it presents a length of one slot.

For example, when the basic unit of the feedback timing is a half slot, N=2, or when it is predefined that one slot includes 2 mini-slots or 2 mini-slots for transmitting the PUCCH, N=2. When N=2, K1=0.5 represents a length of a half slot, e.g., 7 symbols.

For another example, when the basic unit of the feedback timing is ¼ slot, N=4, or when it is predefined that one slot includes 4 mini-slots or 4 mini-slots for transmitting the PUCCH, N=4. When N=4, K1=0.25 represents a length of ¼ slot, e.g., 3 or 4 symbols. To be specific, whether one basic unit includes 3 or 4 symbols may be predefined or pre-configured. For example, a first PUCCH within one slot may have a basic unit with a length of 3 symbols, a second PUCCH may have a basic unit with a length of 4 symbols, a third PUCCH may have a basic unit with a length of 3 symbols, and a fourth PUCCH may have a basic unit with a length of 4 symbols. Of course, the lengths of the basic units for the PUCCHs may also be replaced with each other. For example, the first PUCCH may have a basic unit with a length of 4 symbols, the second PUCCH may have a basic unit with a length of 3 symbols, the third PUCCH may have a basic unit with a length of 3 symbols, and the fourth PUCCH may have a basic unit with a length of 4 symbols.

In the specific implementation of Step 214, a part of the determined slot where the HARQ-ACK is transmitted may be determined as follows.

When (K1*N) mod N=i, the HARQ-ACK may be transmitted in an (i+1)$^{th}$ part, an (i+1)$^{th}$ mini-slot or a mini-slot with an index of i in N parts of the slot ⌊n+K1⌋ or n+⌊K1⌋ where i=0, 1, 2, . . . , N−1, and the N parts are N parts not overlapping each other and acquired through dividing one slot in a chronological order or an ascending order of indices of OFDM symbols, or N mini-slots within one slot.

For example, when N=2, one slot may be divided into two parts, i.e., a first half slot and a second half slot.

When (K1*N) mod N=0, i.e., K1 is an integer, it may be determined that the HARQ-ACK is transmitted within the first half slot of the slot ⌊n+K1⌋ or n+⌊K1⌋.

Figure 4:
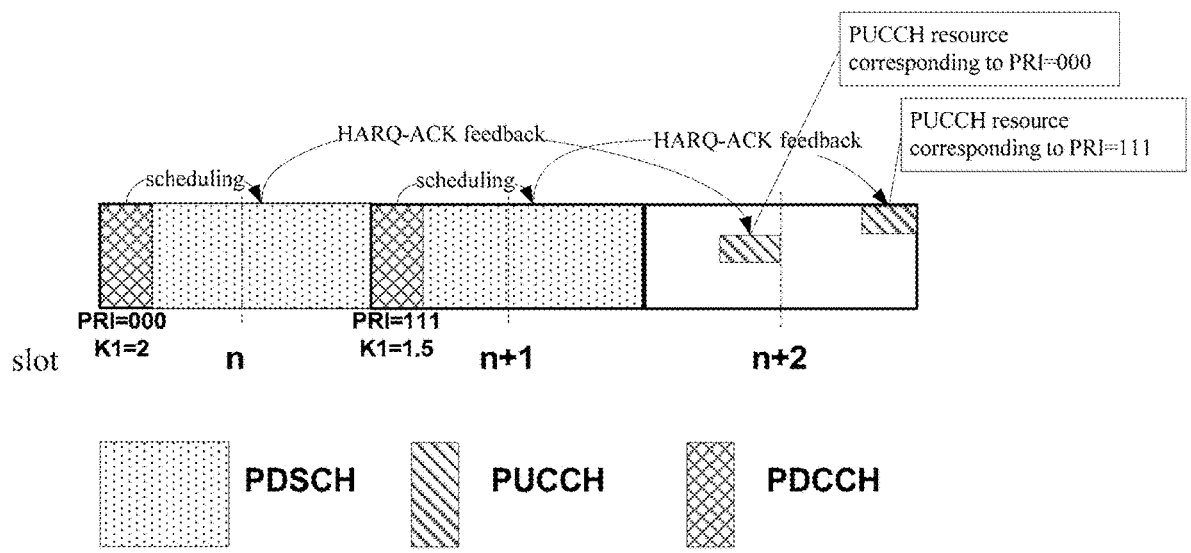
FIG. 4 is another schematic view showing the feedback timing of the HARQ-ACK according to one embodiment of the present disclosure.

When (K1*N) mod N=1, i.e., K1 is a decimal, it may be determined that the HARQ-ACK is transmitted within the second half slot of the slot ⌊n+K1⌋ n+⌊K1⌋ or In the fourth implementation mode of Step 21, as shown in FIG. 4, it is defined that K1={1, 1.5, 2, 2.5}, K1=0.5 represents a length of a half slot, and K1=1 represents a length of one slot. At the terminal side, when the terminal has received one PDSCH within the slot n, the terminal may determine that an HARQ-ACK for the PDSCH is transmitted within the slot n+⌊K1⌋ in accordance with a value of K1 indicated by an HARQ-ACK timing indicator field in DCI used by a PDCCH for scheduling the PDSCH (PDSCH-to-HARQ-timing-indicator field).

For example, when K1=2 as indicated in the DCI, the terminal may determine that the HARQ-ACK for the PDSCH is transmitted within a slot n+⌊1⌋=n+2. In addition, because K1 is an integer and (K1*N) mod N=0, i.e., the HARQ-ACK for the PDSCH is transmitted within a first half slot within the slot n+2, the terminal may further determine one PUCCH resource in preconfigured PUCCH resources in accordance with a PUCCH resource indicator field in the DCI, and a starting symbol of the resource needs to be within the first half slot of the slot n+2. Hence, the terminal may transmit the HARQ-ACK for the PDSCH within the slot n on one PUCCH within the first half slot within the slot n+2.

When the terminal has received one PDSCH within a slot n+1, the terminal may determine that an HARQ-ACK for the PDSCH is transmitted within a slot n+1+⌊K1⌋ in accordance with a value of K1 indicated by an HARQ-ACK timing indicator field in DCI used by a PDCCH for scheduling the PDSCH (PDSCH-to-HARQ-timing-indicator field). For example, when K1=1.5 as indicated in the DCI, the terminal may determine that the HARQ-ACK for the PDSCH is transmitted within a slot n+1+⌊K1⌋=n+2. In addition, because K1 is an odd number and (K1*N) mod N=1, i.e., the HARQ-ACK for the PDSCH is transmitted within a second half slot of the slot n+2, the terminal may further determine one PUCCH resource in preconfigured PUCCH resources in accordance with a PUCCH resource indicator field in the DCI, and a starting symbol of the resource needs to be within the second half slot of the slot n+2. Hence, the terminal may transmit the HARQ-ACK for the PDSCH within the slot n+1 on a PUCCH within the second half slot of the slot n+2.

At the base station side, like that mentioned hereinabove, the base station may determine that the HARQ-ACK for the PDSCH within the slot n is received on a PUCCH resource within the first half slot of the slot n+2 and the HARQ-ACK for the PDSCH within the slot n+1 is received on a PUCCH resource within the second half slot within the slot n+2.

In a possible embodiment of the present disclosure, in a fifth implementation mode, Step 21 of determining the transmission position of the HARQ-ACK may include Step 215 of, when the transmission position of the downlink transmission is a slot n, determining the transmission position of the HARQ-ACK as a mini-slot n*N+K1, where N represents the quantity of mini-slots within one slot, and for an index i of the mini-slot, i=0, 1, 2, . . . N−1. When the mini-slot index n*N+K1 of the mini-slot is greater than a maximum mini-slot index within a radio frame, the mini-slot index may be (n*N+K1) mod T, where T represents the quantity of mini-slots in the radio frame.

Figure 5:
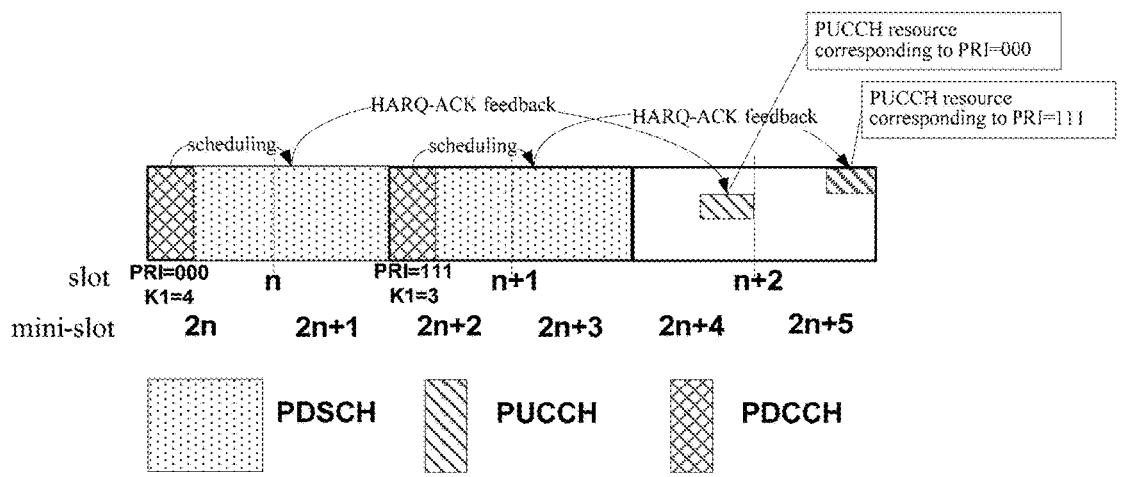
FIG. 5 is yet another schematic view showing the feedback timing of the HARQ-ACK according to one embodiment of the present disclosure.

During the implementation, as shown in FIG. 5, it is presumed that K1 is an integer, K1=1 represents a length of a half slot, K1={2, 3, 4, 5}, and N=2. At the terminal side, one slot may be divided into N mini-slots each with a mini-slot index i, where i=0, 1. For the downlink transmission within the slot n, the HARQ-ACK may be transmitted within the mini-slot n*N+K1.

When the terminal has received one PDSCH within the slot n, the terminal may determine that an HARQ-ACK for the PDSCH is transmitted within the mini-slot n*N+K1 in accordance with a value of K1 indicated by an HARQ-ACK timing indicator field in DCI used by a PDCCH for scheduling the PDSCH (PDSCH-to-HARQ-timing-indicator field).

For example, when K1=4 as indicated in the DCI, the terminal may determine that the HARQ-ACK for the PDSCH is transmitted within a mini-slot n*N+K1=2n+4. The mini-slot 2n+4 is equivalent to the first half slot of the slot n+2, so the terminal may further determine one PUCCH resource in preconfigured PUCCH resources in accordance with a PUCCH resource indicator field in the DCI, and a starting symbol of the resource needs to be within the mini-slot 2n+4, i.e., the first half slot of the slot n+2. Hence, the terminal may transmit the HARQ-ACK for the PDSCH within the slot n on one PUCCH within the mini-slot 2n+4.

When the terminal has received one PDSCH within a slot n+1, the terminal may determine that an HARQ-ACK for the PDSCH is transmitted within a mini-slot (n+1)*N+K1 in accordance with a value of K1 indicated by an HARQ-ACK timing indicator field in DCI used by a PDCCH for scheduling the PDSCH (PDSCH-to-HARQ-timing-indicator field).

For example, when K1=3 as indicated in the DCI, the terminal may determine that the HARQ-ACK for the PDSCH is transmitted within a mini-slot (n+1)*N+K1=2n+5. The mini-slot 2n+5 is equivalent to the second half slot of the slot n+2, so the terminal may further determine one PUCCH resource in preconfigured PUCCH resources in accordance with a PUCCH resource indicator field in the DCI, and a starting symbol of the resource needs to be within the mini-slot 2n+5, i.e., the second half slot of the slot n+2. Hence, the terminal may transmit the HARQ-ACK for the PDSCH within the slot n+1 on a PUCCH within the mini-slot 2n+5.

At the base station side, like that mentioned hereinabove, the base station may determine that the HARQ-ACK for the PDSCH within the slot n is received on a PUCCH resource within the mini-slot 2n+4 and the HARQ-ACK for the PDSCH within the slot n+1 is received on a PUCCH resource within the mini-slot 2n+5.

In the embodiments of the present disclosure, when an SCS of a PUCCH carrying the HARQ-ACK is different from an SCS of the downlink transmission, n may be replaced with a reference index ñ determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases},$$

where $\mu_{PUCCH}$ represents an index corresponding to the SCS of the PUCCH, and $\mu_{PDSCH}$ represents an index corresponding to the SCS of the downlink transmission.

The index corresponding to the SCS may be acquired from the following Table 4.2-1 in Section 4.2 "numerologies" in 3GPP TS 38.211, where Δf represents the SCS, and μ represents the index corresponding to the SCS.

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Alternatively, a position corresponding to K1=0 is defined as a slot for PUCCH transmission comprising the downlink transmission, a last slot for PUCCH transmission comprising the downlink transmission, or a first slot for PUCCH transmission comprising the downlink transmission. In other words, after a slot where the PUCCH is located has been found in the case of K1=0, the feedback timing may be determined in accordance with an actual value of K1 with the slot as a starting point, so as to determine the slot where the actual PUCCH transmission is located and a portion of the PUCCH within the slot. For example, a slot where the downlink transmission is performed is n', and the slot n is determined as a slot where the PUCCH corresponding to the downlink transmission is located when K1=0. When K1=1 as actually indicated in the DCI for the downlink transmission, it means that the transmission position of the PUCCH is a position which is located after the slot n, as a starting point, at an interval of three basic units of the feedback timing. For example, based on the above-mentioned second mode, the PUCCH may be transmitted within the second half slot of the slot n+1. Values of n and n' may be the same or different, depending on a difference between an uplink SCS and a downlink SCS.

According to the embodiments of the present disclosure, when the granularity of the feedback timing of the HARQ-ACK has been reduced, appropriate HARQ-ACK timing may be determined in accordance with the transmission position of the downlink transmission and the feedback timing of the HARQ-ACK, so as to normally feed back the HARQ-ACK for the downlink transmission.

Figure 6:
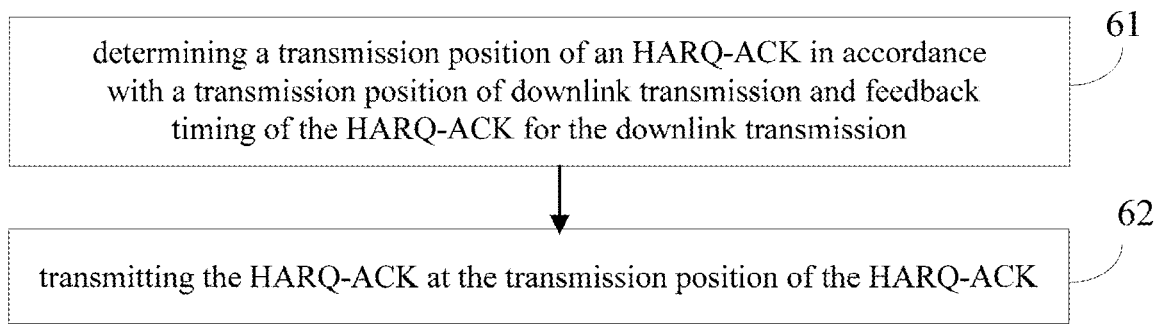
FIG. 6 is a flow chart of a transmission method for HARQ feedback information realized by a terminal according to one embodiment of the present disclosure.

As shown in FIG. 6, the present disclosure further provides in some embodiments a transmission method for HARQ feedback information realized by a terminal, which includes: Step 61 of determining a transmission position of an HARQ-ACK in accordance with a transmission position of downlink transmission and feedback timing of the HARQ-ACK for the downlink transmission, granularity of the feedback timing being smaller than one slot; and Step 62 of transmitting the HARQ-ACK at the transmission position of the HARQ-ACK.

Step 61 of determining the transmission position of the HARQ-ACK may include, when the transmission position of the downlink transmission is a slot n, determining the transmission position of the HARQ-ACK as a slot n+⌈K1/N⌉, where K1 represents a value of the feedback timing of the HARQ-ACK and it is an integer, the granularity of the feedback timing is 1/N slot, and N is a predetermined integer greater than 1.

When K1=0, the HARQ-ACK may be transmitted in a first part, an $N^{th}$ part, a first mini-slot, an $N^{th}$ mini-slot, a mini-slot with an index of 0, or a mini-slot with an index of N−1 in N parts of the slot n+⌈K1/⌉; when K1>0 and (K1−1) mod N=i, the HARQ-ACK may be transmitted in an $(i+1)^{th}$ part, an $(i+1)^{th}$ mini-slot, or a mini-slot with an index of i in the N parts of the slot n+⌈K1/N⌉; or when (K1+N−1) mod N=i, the HARQ-ACK may be transmitted in the $(i+1)^{th}$ part, the $(i+1)^{th}$ mini-slot or the mini-slot with an index of i in the N parts of the slot n+⌈K1/N⌉, where i=0, 1, 2, . . . , N−1, and the N parts are N parts not overlapping each other and acquired through dividing one slot in a chronological order or an ascending order of indices of OFDM symbols, or N mini-slots within one slot.

Step 61 of determining the transmission position of the HARQ-ACK may include, when the transmission position of the downlink transmission is a slot n, determining the transmission position of the HARQ-ACK as a slot n+⌊K1/N⌋ where K1 represents a value of the feedback timing of the HARQ-ACK and it is an integer, the granularity of the feedback timing is 1/N slot, and N is a predetermined integer greater than 1.

When K1 mod N=i, the HARQ-ACK may be transmitted in an $(i+1)^{th}$ part, an $(i+1)^{th}$ mini-slot or a mini-slot with an index of i in N parts of the slot n+⌊K1/N⌋, where i=0, 1, 2, . . . , N−1, and the N parts are N parts not overlapping each other and acquired through dividing one slot in a chronological order or an ascending order of indices of OFDM symbols, or N mini-slots within one slot.

Step 61 of determining the transmission position of the HARQ-ACK may include, when the transmission position of the downlink transmission is a slot n, determining the transmission position of the HARQ-ACK as a slot ⌈n+K1⌉ or n+⌈K1⌉, where K1 represents a value of the feedback timing of the HARQ-ACK and it is an integral multiple of 1/N, the granularity of the feedback timing is 1/N slot, and N is a predetermined integer greater than 1.

When K1=0, the HARQ-ACK may be transmitted in a first part, an $N^{th}$ part, a first mini-slot, an $N^{th}$ mini-slot, a mini-slot with an index of 0, or a mini-slot with an index of N−1 in N parts of the slot ⌈n+K1⌉ or n+⌈K1⌉; when K1>0 and (K1*N−1) mod N=i, the HARQ-ACK may be transmitted in an $(i+1)^{th}$ part, an $(i+1)^{th}$ mini-slot, or a mini-slot with an index of i in the N parts of the slot ⌈n+K1⌉ or n+⌈K1⌉; or when (K1*N+N−1) mod N=i, the HARQ-ACK may be transmitted in the (i+1)th part, the (i+1)th mini-slot or the mini-slot with an index of i in the N parts of the slot ⌈n+K1⌉ or n+⌈K1⌉, where i=0, 1, 2, . . . , N−1, and the N parts are N parts not overlapping each other and acquired through dividing one slot in a chronological order or an ascending order of indices of OFDM symbols, or N mini-slots within one slot.

Step 61 of determining the transmission position of the HARQ-ACK may include, when the transmission position of the downlink transmission is a slot n, determining the transmission position of the HARQ-ACK as a slot ⌊n+K1⌋ or n+⌊K1⌋, where K1 represents a value of the feedback timing of the HARQ-ACK and it is an integral multiple of 1/N, the granularity of the feedback timing is 1/N slot, and N is a predetermined integer greater than 1.

When (K1*N) mod N=i, the HARQ-ACK may be transmitted in an $(i+1)^{th}$ part, an $(i+1)^{th}$ mini-slot or a mini-slot with an index of i in N parts of the slot ⌊n+K1⌋ or n+⌊K1⌋, where i=0, 1, 2, . . . , N−1, and the N parts are N parts not overlapping each other and acquired through dividing one slot in a chronological order or an ascending order of indices of OFDM symbols, or N mini-slots within one slot.

Step 61 of determining the transmission position of the HARQ-ACK may include, when the transmission position of the downlink transmission is a slot n, determining the transmission position of the HARQ-ACK as a mini-slot n*N+K1 where N represents the quantity of mini-slots within one slot.

When the mini-slot index n*N+K1 of the mini-slot is greater than a maximum mini-slot index within a radio frame, the mini-slot index may be (n*N+K1) mod T, where T represents the quantity of mini-slots in the radio frame.

The downlink transmission may include the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

When an SCS of a PUCCH carrying the HARQ-ACK is different from an SCS of the downlink transmission, n may be replaced with a reference index ñ determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases},$$

where $\mu_{PUCCH}$ represents an index corresponding to the SCS of the PUCCH, and $\mu_{PDSCH}$ represents an index corresponding to the SCS of the downlink transmission; or a position corresponding to K1=0 is defined as a slot for PUCCH transmission comprising the downlink transmission, a last slot for PUCCH transmission comprising the downlink transmission, or a first slot for PUCCH transmission comprising the downlink transmission.

According to the embodiments of the present disclosure, when the granularity of the feedback timing of the HARQ-ACK has been reduced, appropriate HARQ-ACK timing may be determined in accordance with the transmission position of the downlink transmission and the feedback timing of the HARQ-ACK, so as to normally feed back the HARQ-ACK for the downlink transmission.

Figure 7:
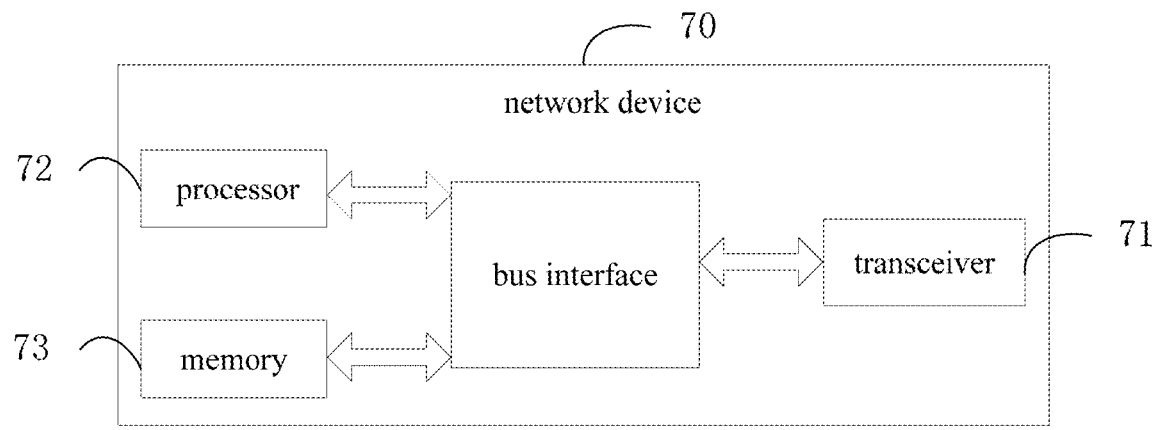
FIG. 7 is a schematic view showing architecture of the network device according to one embodiment of the present disclosure.

As shown in FIG. 7, the present disclosure further provides in some embodiments a network device 70, which includes: a processing module 72 configured to determine a transmission position of an HARQ-ACK in accordance with a transmission position of downlink transmission and feedback timing of the HARQ-ACK for the downlink transmission, granularity of the feedback timing being smaller than one slot; and a transceiver module 71 configured to receive the HARQ-ACK at the transmission position of the HARQ-ACK.

The processing module 72 is specifically configured to, when the transmission position of the downlink transmission is a slot n, determine the transmission position of the HARQ-ACK as a slot n+⌈K1/N ⌉, where K1 represents a value of the feedback timing of the HARQ-ACK and it is an integer, the granularity of the feedback timing is 1/N slot, and N is a predetermined integer greater than 1.

When K1=0, the HARQ-ACK may be transmitted in a first part, an $N^{th}$ part, a first mini-slot, an $N^{th}$ mini-slot, a mini-slot with an index of 0, or a mini-slot with an index of N−1 in N parts of the slot n+⌈K1/N⌉; when K1>0 and (K1−1) mod N=i, the HARQ-ACK may be transmitted in an $(i+1)^{th}$ part, an $(i+1)^{th}$ mini-slot, or a mini-slot with an index of i in the N parts of the slot n+⌈K1/N⌉; or when (K1+N−1) mod N=i, the HARQ-ACK may be transmitted in the $(i+1)^{th}$ part, the $(i+1)^{th}$ mini-slot or the mini-slot with an index of i in the N parts of the slot n+⌈K1/N⌉, where i=0, 1, 2, . . . , N−1, and the N parts are N parts not overlapping each other and acquired through dividing one slot in a chronological order or an ascending order of indices of OFDM symbols, or N mini-slots within one slot.

The processing module 72 is specifically configured to, when the transmission position of the downlink transmission is a slot n, determine the transmission position of the HARQ-ACK as a slot ⌊n+K1/N⌋, where K1 represents a value of the feedback timing of the HARQ-ACK and it is an integer, the granularity of the feedback timing is 1/N slot, and N is a predetermined integer greater than 1.

When K1 mod N=i, the HARQ-ACK may be transmitted in an $(i+1)^{th}$ part, an $(i+1)^{th}$ mini-slot or a mini-slot with an index of i in N parts of the slot n+⌊K1/N⌋ where i=0, 1, 2, . . . , N−1, and the N parts are N parts not overlapping each other and acquired through dividing one slot in a chronological order or an ascending order of indices of OFDM symbols, or N mini-slots within one slot.

The processing module 72 is specifically configured to, when the transmission position of the downlink transmission is a slot n, determine the transmission position of the HARQ-ACK as a slot n+⌈K1⌉ or n+⌈K1⌉, where K1 represents a value of the feedback timing of the HARQ-ACK and it is an integral multiple of 1/N, the granularity of the feedback timing is 1/N slot, and N is a predetermined integer greater than 1.

When K1=0, the HARQ-ACK may be transmitted in a first part, an $N^{th}$ part, a first mini-slot, an $N^{th}$ mini-slot, a mini-slot with an index of 0, or a mini-slot with an index of N−1 in N parts of the slot ⌈n+K1⌉ or n+⌈K1⌉; when K1>0 and (K1*N−1) mod N=i, the HARQ-ACK may be transmitted in an $(i+1)^{th}$ part, an $(i+1)^{th}$ mini-slot, or a mini-slot with an index of i in the N parts of the slot ⌈n+K1⌉ or n+⌈K1⌉; or when (K1*N+N−1) mod N=i, the HARQ-ACK may be transmitted in the $(i+1)^{th}$ part, the $(i+1)^{th}$ mini-slot or the mini-slot with an index of i in the N parts of the slot ⌈n+K1⌉ or n+⌈K1⌉, where i=0, 1, 2, . . . , N−1, and the N parts are N parts not overlapping each other and acquired through dividing one slot in a chronological order or an ascending order of indices of OFDM symbols, or N mini-slots within one slot.

The processing module 72 is specifically configured to, when the transmission position of the downlink transmission is a slot n, determine the transmission position of the HARQ-ACK as a slot ⌊n+K1⌋ or n+⌊K1⌋ where K1 represents a value of the feedback timing of the HARQ-ACK and it is an integral multiple of 1/N, the granularity of the feedback timing is 1/N slot, and N is a predetermined integer greater than 1.

When (K1*N) mod N=i, the HARQ-ACK may be transmitted in an $(i+1)^{th}$ part, an $(i+1)^{th}$ mini-slot or a mini-slot with an index of i in N parts of the slot ⌊n+K1⌋ or n+⌊K1⌋ where i=0, 1, 2, . . . , N−1, and the N parts are N parts not overlapping each other and acquired through dividing one slot in a chronological order or an ascending order of indices of OFDM symbols, or N mini-slots within one slot.

The processing module 72 is specifically configured to, when the transmission position of the downlink transmission is a slot n, determine the transmission position of the HARQ-ACK as a mini-slot n*N+K1, where N represents the quantity of mini-slots within one slot.

When the mini-slot index n*N+K1 of the mini-slot is greater than a maximum mini-slot index within a radio frame, the mini-slot index may be (n*N+K1) mod T, where T represents the quantity of mini-slots in the radio frame.

The downlink transmission may include the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

When an SCS of a PUCCH carrying the HARQ-ACK is different from an SCS of the downlink transmission, n may be replaced with a reference index ñ determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases},$$

where, $\mu_{PUCCH}$ represents an index corresponding to the SCS of the PUCCH, and $\mu_{PDSCH}$ Represents an index corresponding to the SCS of the downlink transmission; or a position corresponding to K1=0 is defined as a slot for PUCCH transmission comprising the downlink transmission, a last slot for PUCCH transmission comprising the downlink transmission, or a first slot for PUCCH transmission comprising the downlink transmission.

It should be appreciated that, the network device may be a device corresponding to the method in FIG. 2, and it may be a base station. All implementation modes in the method may be applied to the network device with a same technical effect. The network device may further include a storage module 73. The transceiver module 71 may be connected to the processing module 72 and the storage module 73 via a bus interface. A function of the transceiver module 71 may be achieved by the processing module 72, and a function of the processing module 72 may also be achieved by the transceiver module 71. Here, the transceiver module 71 may be specifically implemented as a transceiver, the processing module 72 may be specifically implemented as a processor, and the storage module 73 may be specifically implemented as a memory.

Figure 8:
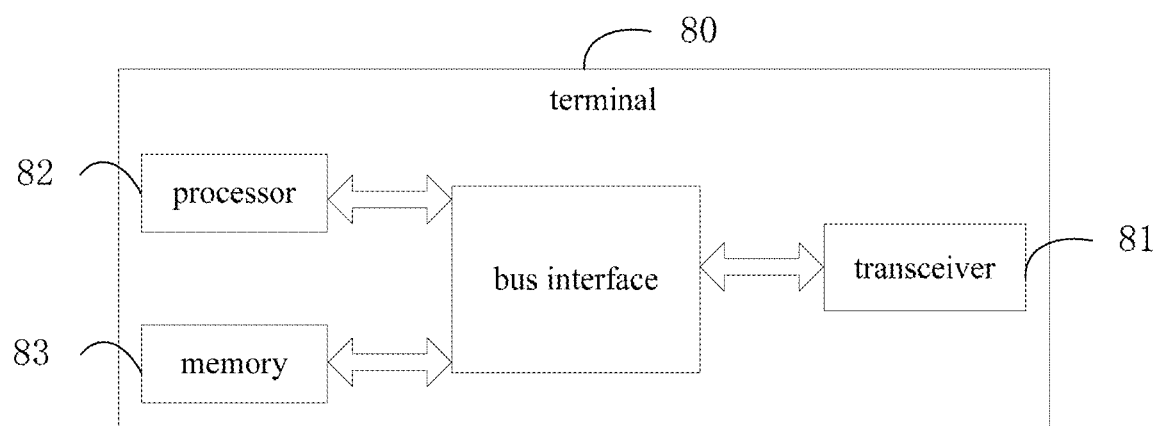
FIG. 8 is a schematic view showing architecture of the terminal according to one embodiment of the present disclosure.

As shown in FIG. 8, the present disclosure further provides in some embodiments a terminal 80, which includes: a processing module 82 configured to determine a transmission position of an HARQ-ACK in accordance with a transmission position of downlink transmission and feedback timing of the HARQ-ACK for the downlink transmission, granularity of the feedback timing being smaller than one slot; and a transceiver module 81 configured to transmit the HARQ-ACK at the transmission position of the HARQ-ACK.

The processing module 82 is specifically configured to, when the transmission position of the downlink transmission is a slot n, determine the transmission position of the HARQ-ACK as a slot n+⌈K1/N⌉, where K1 represents a value of the feedback timing of the HARQ-ACK and it is an integer, the granularity of the feedback timing is 1/N slot, and N is a predetermined integer greater than 1.

When K1=0, the HARQ-ACK may be transmitted in a first part, an $N^{th}$ part, a first mini-slot, an $N^{th}$ mini-slot, a mini-slot with an index of 0, or a mini-slot with an index of N−1 in N parts of the slot n+⌈K1/N⌈; when K1>0 and (K1−1) mod N=i, the HARQ-ACK may be transmitted in an $(i+1)^{th}$ part an $(i+1)^{th}$ mini-slot, or a mini-slot with an index of i in the N parts of the slot n+⌈K1/N⌉; or when (K1+N−1) mod N=i, the HARQ-ACK may be transmitted in the $(i+1)^{th}$ part, the $(i+1)^{th}$ mini-slot or the mini-slot with an index of i in the N parts of the slot n+⌈K1/N⌉, where i=0, 1, 2, . . . , N−1, and the N parts are N parts not overlapping each other and acquired through dividing one slot in a chronological order or an ascending order of indices of OFDM symbols, or N mini-slots within one slot.

The processing module 82 is specifically configured to, when the transmission position of the downlink transmission is a slot n, determine the transmission position of the HARQ-ACK as a slot n+⌊K1/N⌋, where K1 represents a value of the feedback timing of the HARQ-ACK and it is an integer, the granularity of the feedback timing is 1/N slot, and N is a predetermined integer greater than 1.

When K1 mod N=i, the HARQ-ACK may be transmitted in an $(i+1)^{th}$ part, an $(i+1)^{th}$ mini-slot or a mini-slot with an index of i in N parts of the slot n+⌊K1/N⌋, where i=0, 1, 2, . . . , N−1, and the N parts are N parts not overlapping each other and acquired through dividing one slot in a chronological order or an ascending order of indices of OFDM symbols, or N mini-slots within one slot.

The processing module 82 is specifically configured to, when the transmission position of the downlink transmission is a slot n, determine the transmission position of the HARQ-ACK as a slot ⌈n+K1⌉ or n+⌈K1⌉, where K1 represents a value of the feedback timing of the HARQ-ACK and it is an integral multiple of 1/N, the granularity of the feedback timing is 1/N slot, and N is a predetermined integer greater than 1.

When K1=0, the HARQ-ACK may be transmitted in a first part, an $N^{th}$ part, a first mini-slot, an $N^{th}$ mini-slot, a mini-slot with an index of 0, or a mini-slot with an index of N−1 in N parts of the slot ⌈n+K1⌉ or n+⌈K1⌉; when K1>0 and (K1*N−1) mod N=i, the HARQ-ACK may be transmitted in an $(i+1)^{th}$ part, an $(i+1)^{th}$ mini-slot, or a mini-slot with an index of i in the N parts of the slot ⌈n+K1⌉ or n+⌈K1⌉; or when (K1*N+N−1) mod N=i, the HARQ-ACK may be transmitted in the (i+1)th part, the (i+1)th mini-slot or the mini-slot with an index of i in the N parts of the slot ⌈n+K1⌉ or n+⌈K1⌉, where i=0, 1, 2, . . . , N−1, and the N parts are N parts not overlapping each other and acquired through dividing one slot in a chronological order or an ascending order of indices of OFDM symbols, or N mini-slots within one slot.

The processing module 82 is specifically configured to, when the transmission position of the downlink transmission is a slot n, determine the transmission position of the HARQ-ACK as a slot ⌊n+K1⌋ or n+⌊K1⌋, where K1 represents a value of the feedback timing of the HARQ-ACK and it is an integral multiple of 1/N, the granularity of the feedback timing is 1/N slot, and N is a predetermined integer greater than 1.

When (K1*N) mod N=i, the HARQ-ACK may be transmitted in an $(i+1)^{th}$ part, an $(i+1)^{th}$ mini-slot or a mini-slot with an index of i in N parts of the slot ⌊n+K1⌋ or n+⌊K1⌋ where i=0, 1, 2, . . . , N−1, and the N parts are N parts not overlapping each other and acquired through dividing one slot in a chronological order or an ascending order of indices of OFDM symbols, or N mini-slots within one slot.

The processing module 82 is specifically configured to, when the transmission position of the downlink transmission is a slot n, determining the transmission position of the HARQ-ACK as a mini-slot n*N+K1, where N represents the quantity of mini-slots within one slot.

When the mini-slot index n*N+K1 of the mini-slot is greater than a maximum mini-slot index within a radio frame, the mini-slot index may be (n*N+K1) mod T, where T represents the quantity of mini-slots in the radio frame.

The downlink transmission may include the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

When an SCS of a PUCCH carrying the HARQ-ACK is different from an SCS of the downlink transmission, n may be replaced with a reference index ñ determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases},$$

where $\mu_{PUCCH}$ represents an index corresponding to the SCS of the PUCCH, and $\mu_{PDSCH}$ represents an index corresponding to the SCS of the downlink transmission; or a position corresponding to K1=0 is defined as a slot for PUCCH transmission comprising the downlink transmission, a last slot for PUCCH transmission comprising the downlink transmission, or a first slot for PUCCH transmission comprising the downlink transmission.

It should be appreciated that, the terminal may be a device corresponding to the method in FIG. 6. All implementation modes in the method may be applied to the terminal with a same technical effect. The terminal may further include a storage module 83. The transceiver module 81 may be connected to the processing module 82 and the storage module 83 via a bus interface. A function of the transceiver module 81 may be achieved by the processing module 82, and a function of the processing module 82 may also be achieved by the transceiver module 81. Here, the transceiver module 81 may be specifically implemented as a transceiver, the processing module 82 may be specifically implemented as a processor, and the storage module 83 may be specifically implemented as a memory.

The present disclosure further provides in some embodiments a communication device. When the communication device is the above-mentioned network device, it includes a processor configured to achieve the following functions: determining a transmission position of an HARQ-ACK in accordance with a transmission position of downlink transmission and feedback timing of the HARQ-ACK for the downlink transmission, granularity of the feedback timing being smaller than one slot; and receiving the HARQ-ACK at the transmission position of the HARQ-ACK. The network device may be a device corresponding to the method in FIG. 2. All implementation modes in the method may be applied to the network device with a same technical effect.

The present disclosure further provides in some embodiments a communication device. When the communication device is the above-mentioned terminal, it includes a processor configured to achieve the following functions: determining a transmission position of an HARQ-ACK in accordance with a transmission position of downlink transmission and feedback timing of the HARQ-ACK for the downlink transmission, granularity of the feedback timing being smaller than one slot; and transmitting the HARQ-ACK at the transmission position of the HARQ-ACK. The terminal may be a device corresponding to the method in FIG. 6. All implementation modes in the method may be applied to the terminal with a same technical effect.

The present disclosure further provides in some embodiments a computer-readable storage medium including an instruction. The instruction is executed by a computer, so as to implement the method in FIG. 2 or FIG. 6.

According to the embodiments of the present disclosure, appropriate HARQ-ACK timing may be determined in accordance with the transmission position of the downlink transmission and the feedback timing of the HARQ-ACK, so as to normally feed back the HARQ-ACK for the downlink transmission.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

It should be further appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be further appreciated that, the embodiments of the present disclosure may be implemented by hardware, software, firmware, middleware, microcode or a combination thereof. For the hardware implementation, the processor may include one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission method for Hybrid Automatic Repeat reQuest (HARQ) feedback information realized by a network device, comprising:
   determining a transmission position of an HARQ-Acknowledgement (ACK) in accordance with a transmission position of downlink transmission and feedback timing of the HARQ-ACK for the downlink transmission, wherein granularity of the feedback timing is smaller than one slot; and
   receiving the HARQ-ACK at the transmission position of the HARQ-ACK,
   wherein the determining the transmission position of the HARQ-ACK comprises:
   mode A, when the transmission position of the downlink transmission is a slot n, determining the transmission position of the HARQ-ACK as a slot n+⌈K1/N⌉,
   wherein K1 represents a value of the feedback timing of the HARQ-ACK and is an integer, the granularity of the feedback timing is 1/N slot, and N is a predetermined integer greater than 1; or
   mode B, when the transmission position of the downlink transmission is a slot n, determining the transmission position of the HARQ-ACK as a slot n+⌊K1/N⌋,
   wherein K1 represents a value of the feedback timing of the HARQ-ACK and is an integer, the granularity of the feedback timing is 1/N slot, and N is a predetermined integer greater than 1; or
   mode C, when the transmission position of the downlink transmission is a slot n, determining the transmission position of the HARQ-ACK as a slot ⌈n+K1⌉ or ⌈n+K1⌉,
   wherein K1 represents a value of the feedback timing of the HARQ-ACK and is an integral multiple of 1/N, the granularity of the feedback timing is 1/N slot, and N is a predetermined integer greater than 1; or
   mode D, when the transmission position of the downlink transmission is a slot n, determining the transmission position of the HARQ-ACK as a slot ⌊n+K1⌋ or ⌊n+K1⌋,
   wherein K1 represents a value of the feedback timing of the HARQ-ACK and is an integral multiple of 1/N, the granularity of the feedback timing is 1/N slot, and N is a predetermined integer greater than 1; or
   mode E, when the transmission position of the downlink transmission is a slot n, determining the transmission position of the HARQ-ACK as a mini-slot n*N+K1 wherein N represents the quantity of mini-slots within one slot.

2. The method according to claim 1, wherein
   in mode A, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot n+⌈K1/N⌉; when K1>0 and (K1−1) mod N−1, the HARQ-ACK is transmitted in an (i+1)th part, an (i+1)th mini-slot, or a mini-slot with an index of i within N parts of the slot n+⌈K1/N⌉; or
   when (K1+N−1) mod N−i, the HARQ-ACK is transmitted in an (i+1)th part, an (i+1)th mini-slot or a mini-slot with an index of i within N parts of the slot n+⌈K1/N⌉,
   wherein i=0, 1, 2, . . . , N−1, and the N parts are N parts not overlapping each other and acquired through dividing one slot in a chronological order or an ascending order of indices of Orthogonal Frequency Division Multiplexing (OFDM) symbols, or the N parts are N mini-slots within one slot; or
   in mode B, when K1 mod N=i, the HARQ-ACK is transmitted in an $(i+1)^{th}$ part, an $(i+1)^{th}$ mini-slot or a mini-slot with an index of i within N parts of the slot n+⌊K1/N⌋,
   wherein i=0, 1, 2, . . . , N−1, and the N parts are N parts not overlapping each other and acquired through dividing one slot in a chronological order or an ascending order of indices of OFDM symbols, or the N parts are N mini-slots within one slot; or
   in mode C, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot ⌈n+K1⌉ or n+⌈K1⌉; when K1>0 and (K1*N−1) mod N=i, the HARQ-ACK is transmitted in an $(i+1)^{th}$ part, an $(i+1)^{th}$ mini-slot, or a mini-slot with an index of i within N parts of the slot ⌈n+K1⌉ or n+⌈K1⌉; or
   when (K1*N+N−1) mod N=i, the HARQ-ACK is transmitted in an $(i+1)^{th}$ part, an $(i+1)^{th}$ mini-slot or a mini-slot with an index of i within N parts of the slot ⌈n+K1⌉ or n+⌈K1⌉ wherein i=0, 1, 2, . . . , N−1, and the N parts are N parts not overlapping each other and acquired through dividing one slot in a chronological order or an ascending order of indices of OFDM symbols, or the N parts are N mini-slots within one slot; or
   in mode D, when (K1*N) mod N=i, the HARQ-ACK is transmitted in an $(i+1)^{th}$ part, an $(i+1)^{th}$ mini-slot or a mini-slot with an index of i within N parts of the slot ⌊n+K1⌋ or n+⌊K1⌋,
   wherein i=0, 1, 2, . . . , N−1, and the N parts are N parts not overlapping each other and acquired through dividing one slot in a chronological order or an ascending order of indices of OFDM symbols, or the N parts are N mini-slots within one slot; or
   in mode E, when the mini-slot index n*N+K1 of the mini-slot is greater than a maximum mini-slot index within a radio frame, the mini-slot index is (n*N+K1) modT wherein T represents the quantity of mini-slots in the radio frame.

3. The method according to claim 1, wherein the downlink transmission comprises the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

4. The method according to claim 2, wherein when a Sub-Carrier Spacing (SCS) of a Physical Uplink Control Channel (PUCCH) carrying the HARQ-ACK is different from a SCS of the downlink transmission, the method further comprises:
   the index n is replaced with a reference index determined ñ accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases}$$

wherein $\mu_{PUCCH}$ represents an index corresponding to the SCS of the PUCCH, and $\mu_{PDSCH}$ represents an index corresponding to the SCS of the downlink transmission; or a position corresponding to K1=0 is defined as a slot for PUCCH transmission comprising the downlink transmission, a last slot for PUCCH transmission comprising the downlink transmission, or a first slot for PUCCH transmission comprising the downlink transmission.

5. A transmission method for Hybrid Automatic Repeat reQuest (HARQ) feedback information realized by a terminal, comprising:
   determining a transmission position of an HARQ-Acknowledgement (ACK) in accordance with a transmission position of downlink transmission and feedback timing of the HARQ-ACK for the downlink transmission, wherein granularity of the feedback timing is smaller than one slot; and
   transmitting the HARQ-ACK at the transmission position of the HARQ-ACK,
   wherein the determining the transmission position of the HARQ-ACK comprises:
   mode A, when the transmission position of the downlink transmission is a slot n, determining the transmission position of the HARQ-ACK as a slot n+[K1/N],
   wherein K1 represents a value of the feedback timing of the HARQ-ACK and is an integer, the granularity of the feedback timing is 1/N slot, and N is a predetermined integer greater than 1; or
   mode B, when the transmission position of the downlink transmission is a slot n, determining the transmission position of the HARQ-ACK as a slot n+⌊K1/N⌋,
   wherein K1 represents a value of the feedback timing of the HARQ-ACK and is an integer, the granularity of the feedback timing is 1/N slot, and N is a predetermined integer greater than 1; or
   mode C, when the transmission position of the downlink transmission is a slot n, determining the transmission position of the HARQ-ACK as a slot ⌈n+K1⌉ or ⌈n+K1⌉,
   wherein K1 represents a value of the feedback timing of the HARQ-ACK and is an integral multiple of 1/N, the granularity of the feedback timing is 1/N slot, and N is a predetermined integer greater than 1; or
   mode D, when the transmission position of the downlink transmission is a slot n, determining the transmission position of the HARQ-ACK as a slot ⌊n+K1⌋ or n+⌊K1⌋ wherein K1 represents a value of the feedback timing of the HARQ-ACK and is an integral multiple of 1/N, the granularity of the feedback timing is 1/N slot, and N is a predetermined integer greater than 1; or
   mode E, when the transmission position of the downlink transmission is a slot n, determining the transmission position of the HARQ-ACK as a mini-slot n*N+K1, wherein N represents the quantity of mini-slots within one slot.

6. The method according to claim 5, wherein
   in mode A, when K1-0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot n+⌈K1/N⌉; when K1>0 and (K1−1) mod N=i, the HARQ-ACK is transmitted in an $(i+1)^{th}$ part, an $(i+1)^{th}$ mini-slot, or a mini-slot with an index of i within N parts of the slot n+⌈K1/N⌉; or
   when (K1+N−1) mod N=i, the HARQ-ACK is transmitted in the $(i+1)^{th}$ part, the $(i+1)^{th}$ n+⌈K1/N⌉ mini-slot or the mini-slot with an index of i within N parts of the slot n+⌈K1/N⌉,
   wherein i=0, 1, 2, ..., N−1, and the N parts are N parts not overlapping each other and acquired through dividing one slot in a chronological order or an ascending order of indices of Orthogonal Frequency Division Multiplexing (OFDM) symbols, or N mini-slots within one slot; or
   in mode B, when K1 mod N=i, the HARQ-ACK is transmitted in an $(i+1)^{th}$ part, an $(i+1)^{th}$ mini-slot or a mini-slot with an index of i within N parts of the slot n+⌊K1/N⌋,
   wherein i=0, 1, 2, ..., N−1, and the N parts are N parts not overlapping each other and acquired through dividing one slot in a chronological order or an ascending order of indices of OFDM symbols, or N mini-slots within one slot; or
   in mode C, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot ⌈n+K1⌉ or n+⌈K1⌉; when K1>0 and (K1*N−1) mod N=i, the HARQ-ACK is transmitted in an $(i+1)^{th}$ part, an $(i+1)^{th}$ mini-slot, or a mini-slot with an index of i within N parts of the slot ⌈n+K1⌉ or n+⌈K1⌉; or
   when (K1*N+N−1) mod N=i, the HARQ-ACK is transmitted in the $(i+1)^{th}$ part, the $(i+1)^{th}$ mini-slot or the mini-slot with an index of i within N parts of the slot ⌈n+K1⌉ or n+⌈K1⌉ wherein i=0, 1, 2, ..., N−1, and the N parts are N parts not overlapping each other and acquired through dividing one slot in a chronological order or an ascending order of indices of OFDM symbols, or N mini-slots within one slot; or
   in mode D, when (K1*N) mod N=i, the HARQ-ACK is transmitted in an $(i+1)^{th}$ part, an $(i+1)^{th}$ mini-slot or a mini-slot with an index of i within N parts of the slot ⌊n+K1⌋ or ⌊n+K1⌋ wherein i=0, 1, 2, ..., N−1, and the N parts are N parts not overlapping each other and acquired through dividing one slot in a chronological order or an ascending order of indices of OFDM symbols, or N mini-slots within one slot; or
   in mode E, when the mini-slot index n*N+K1 of the mini-slot is greater than a maximum mini-slot index within a radio frame, the mini-slot index is (n*N+K1) modT wherein T represents the quantity of mini-slots in the radio frame.

7. The method according to claim 5, wherein the downlink transmission comprises the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

8. The method according to claim 5, wherein when a Sub-Carrier Spacing (SCS) of a Physical Uplink Control Channel (PUCCH) carrying the HARQ-ACK is different from a Sub Carrier Spacing (SCS) of the downlink transmission, n is replaced with a reference index ñ determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases},$$

wherein $\mu_{PUCCH}$ represents an index corresponding to the SCS of the PUCCH, and $\mu_{PDSCH}$ represents an index corresponding to the SCS of the downlink transmission; or
  a position corresponding to K1-0 is defined as a slot for PUCCH transmission comprising the downlink transmission, a last slot for PUCCH transmission comprising the downlink transmission, or a first slot for PUCCH transmission comprising the downlink transmission.

9. A network device, which comprises a transceiver, a memory, a processor, and a program stored in the memory and executed by the processor, wherein the processor is configured to execute the program so as to implement the transmission method for Hybrid Automatic Repeat reQuest (HARQ) feedback information according to claim 1.

10. The network device according to claim 9, wherein
  in mode A, when K1-0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot n+⌈K1/N⌉; when K1>0 and (K1-1) mod N=i, the HARQ-ACK is transmitted in an $(i+1)^{th}$ part, an $(i+1)^{th}$ mini-slot, or a mini-slot with an index of i within N parts of the slot n+⌈K1/N 1⌉; or
  when (K1+N−1) mod N=i, the HARQ-ACK is transmitted in an $(i+1)^{th}$ part, an $(i+1)^{th}$ mini-slot or a mini-slot with an index of i within N parts of the slot n+⌈K1/N⌉,
  wherein i=0, 1, 2, . . . , N−1, and the N parts are N parts not overlapping each other and acquired through dividing one slot in a chronological order or an ascending order of indices of Orthogonal Frequency Division Multiplexing (OFDM) symbols, or the N parts are N mini-slots within one slot; or
  in mode B, when K1 mod N=i, the HARQ-ACK is transmitted in an $(i+1)^{th}$ part, an $(i+1)^{th}$ mini-slot or a mini-slot with an index of i within N parts of the slot n+⌊K1/N⌋,
  wherein i=0, 1, 2, . . . , N−1, and the N parts are N parts not overlapping each other and acquired through dividing one slot in a chronological order or an ascending order of indices of OFDM symbols, or the N parts are N mini-slots within one slot; or
  in mode C, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot ⌈n+K1⌉ or n+⌈K1⌉; when K1>0 and (K1*N−1) mod N=i, the HARQ-ACK is transmitted in an $(i+1)^{th}$ part, an $(i+1)^{th}$ mini-slot, or a mini-slot with an index of i within N parts of the slot ⌈n+K1⌉ or n+⌈K1⌉; or
  when (K1*N+N−1) mod N=i, the HARQ-ACK is transmitted in an $(i+1)^{th}$ part, an $(i+1)^{th}$ mini-slot or a mini-slot with an index of i within N parts of the slot ⌈n+K1⌉ n+⌈K1⌉ wherein i=0, 1, 2, . . . , N−1, and the N parts are N parts not overlapping each other and acquired through dividing one slot in a chronological order or an ascending order of indices of OFDM symbols, or the N parts are N mini-slots within one slot; or
  in mode D, when (K1*N) mod N=i, the HARQ-ACK is transmitted in an $(i+1)^{th}$ part, an $(i+1)^{th}$ mini-slot or a mini-slot with an index of i within N parts of the slot ⌊n+K1⌋ or n+⌊K1⌋,
  wherein i=0, 1, 2, . . . , N−1, and the N parts are N parts not overlapping each other and acquired through dividing one slot in a chronological order or an ascending order of indices of OFDM symbols, or the N parts are N mini-slots within one slot; or
  in mode E, when the mini-slot index n*N+K1 of the mini-slot is greater than a maximum mini-slot index within a radio frame, the mini-slot index is (n*N+K1) modT wherein T represents the quantity of mini-slots in the radio frame.

11. The network device according to claim 9, wherein the downlink transmission comprises the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

12. The network device according to claim 9, wherein when a Sub-Carrier Spacing (SCS) of a Physical Uplink Control Channel (PUCCH) carrying the HARQ-ACK is different from a SCS of the downlink transmission, the method further comprises:
  the index n is replaced with a reference index n determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{\mu_{PDSCH}}} - 1 & \mu_{PDSCH} < \mu_{PUCCH} \end{cases},$$

wherein $\mu_{PUCCH}$ represents an index corresponding to the SCS of the PUCCH, and $\mu_{PDSCH}$ represents an index corresponding to the SCS of the downlink transmission; or
  a position corresponding to K1=0 is defined as a slot for PUCCH transmission comprising the downlink transmission, a last slot for PUCCH transmission comprising the downlink transmission, or a first slot for PUCCH transmission comprising the downlink transmission.

13. A terminal, which comprises a transceiver, a memory, a processor, and a program stored in the memory and executed by the processor, wherein the processor is configured to execute the program so as to implement a transmission method for Hybrid Automatic Repeat reQuest (HARQ) feedback information realized by a terminal, comprising:
  determining a transmission position of an HARQ-Acknowledgement (ACK) in accordance with a transmission position of downlink transmission and feedback timing of the HARQ-ACK for the downlink transmission, wherein granularity of the feedback timing is smaller than one slot; and
  transmitting the HARQ-ACK at the transmission position of the HARQ-ACK, wherein the determining the transmission position of the HARQ-ACK comprises:

mode A, when the transmission position of the downlink transmission is a slot n, determining the transmission position of the HARQ-ACK as a slot n+⌈K1/N⌉,
wherein K1 represents a value of the feedback timing of the HARQ-ACK and is an integer, the granularity of the feedback timing is 1/N slot, and N is a predetermined integer greater than 1; or mode B, when the transmission position of the downlink transmission is a slot n, determining the transmission position of the HARQ-ACK as a slot n+⌊K1/N⌋,
wherein K1 represents a value of the feedback timing of the HARQ-ACK and is an integer, the granularity of the feedback timing is 1/N slot, and N is a predetermined integer greater than 1; or mode C, when the transmission position of the downlink transmission is a slot n, determining the transmission position of the HARQ-ACK as a slot ⌈n+K1⌉ or n+⌈K1⌉,
wherein K1 represents a value of the feedback timing of the HARQ-ACK and is an integral multiple of 1/N, the granularity of the feedback timing is 1/N slot, and N is a predetermined integer greater than 1; or mode D, when the transmission position of the downlink transmission is a slot n, determining the transmission position of the HARQ-ACK as a slot ⌊n+K1⌋ or ⌊n+K1⌋
wherein K1 represents a value of the feedback timing of the HARQ-ACK and is an integral multiple of 1/N, the granularity of the feedback timing is 1/N slot, and N is a predetermined integer greater than 1; or mode E, when the transmission position of the downlink transmission is a slot n, determining the transmission position of the HARQ-ACK as a mini-slot n*N+K1, wherein N represents the quantity of mini-slots within one slot.

14. The terminal according to claim 13, wherein in mode A, when K1-0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot n+⌈K1/N⌉; when K1>0 and (K1−1) mod N=i, the HARQ-ACK is transmitted in an $(i+1)^{th}$ part, an $(i+1)^{th}$ mini-slot, or a mini-slot with an index of i within N parts of the slot n+⌈K1/N⌉; or when (K1+N−1) mod N=i, the HARQ-ACK is transmitted in the $(i+1)^{th}$ part, the $(i+1)^{th}$ mini-slot or the mini-slot with an index of i within N parts of the slot n+⌈K1/N⌉,
wherein i=0, 1, 2, ..., N−1, and the N parts are N parts not overlapping each other and acquired through dividing one slot in a chronological order or an ascending order of indices of Orthogonal Frequency Division Multiplexing (OFDM) symbols, or N mini-slots within one slot; or in mode B, when K1 mod N=i, the HARQ-ACK is transmitted in an $(i+1)^{th}$ part, an ⌊n+K1/N⌋, $(i+1)^{th}$ mini-slot or a mini-slot with an index of i within N parts of the slot n+⌊K1/N⌋,
wherein i=0, 1, 2, ..., N−1, and the N parts are N parts not overlapping each other and acquired through dividing one slot in a chronological order or an ascending order of indices of OFDM symbols, or N mini-slots within one slot; or in mode C, when K1=0, the HARQ-ACK is transmitted in a first part, an $N^{th}$ part, a first mini-slot, an $N^{th}$ mini-slot, a mini-slot with an index of 0, or a mini-slot with an index of N−1 within N parts of the slot ⌈n+K1⌉ or n+⌈K1⌉; when K1>0 and (K1*N−1) mod N=i, the HARQ-ACK is transmitted in an $(i+1)^{th}$ part, an $(i+1)^{th}$ mini-slot, or a mini-slot with an index of i within N parts of the slot ⌈n+K1⌉ n+⌈K1⌉; or when (K1*N+N−1) mod N=i, the HARQ-ACK is transmitted in the $(i+1)^{th}$ part, the $(i+1)^{th}$ mini-slot or the mini-slot with an index of i within N parts of the slot ⌈n+K1⌉ or n+⌈K1⌉ wherein i=0, 1, 2, ..., N−1, and the N parts are N parts not overlapping each other and acquired through dividing one slot in a chronological order or an ascending order of indices of OFDM symbols, or N mini-slots within one slot; or in mode D, when (K1*N) mod N=i, the HARQ-ACK is transmitted in an $(i+1)^{th}$ part, an $(i+1)^{th}$ mini-slot or a mini-slot with an index of i within N parts of the slot ⌊n+K1⌋ or n+⌊K1⌋ wherein i=0, 1, 2, ..., N−1, and the N parts are N parts not overlapping each other and acquired through dividing one slot in a chronological order or an ascending order of indices of OFDM symbols, or N mini-slots within one slot; or in mode E, when the mini-slot index n*N+K1 of the mini-slot is greater than a maximum mini-slot index within a radio frame, the mini-slot index is (n*N+K1) modT wherein T represents the quantity of mini-slots in the radio frame.

15. The terminal according to claim 13, wherein the downlink transmission comprises the transmission of a Physical Downlink Shared Channel (PDSCH), the transmission of a Physical Downlink Control Channel (PDCCH) indicating Semi-Persistent Scheduling (SPS) PDSCH release or a Downlink Control Information (DCI) indicating SPS PDSCH release, or a SPS PDSCH release.

16. The terminal according to claim 13, wherein when a Sub-Carrier Spacing (SCS) of a Physical Uplink Control Channel (PUCCH) carrying the HARQ-ACK is different from a Sub Carrier Spacing (SCS) of the downlink transmission, n is replaced with a reference index ñ determined in accordance with the SCS of the PUCCH and the SCS of the downlink transmission, and $$\tilde{n} = \begin{cases} \left\lfloor n \cdot \frac{2^{\mu_{PUCCH}}}{2^{\mu_{PDSCH}}} \right\rfloor & \mu_{PDSCH} \geq \mu_{PUCCH} \\ (n+1) \cdot \frac{2^{\mu_{PUCCH}}}{2^{PDSCH}} - 1 & \mu_{PDSCH} < \mu_{PUCCH} \end{cases},$$

wherein $\mu_{PUCCH}$ represents an index corresponding to the SCS of the PUCCH, and $\mu_{PDSCH}$ represents an index corresponding to the SCS of the downlink transmission; or a position corresponding to K1=0 is defined as a slot for PUCCH transmission comprising the downlink transmission, a last slot for PUCCH transmission comprising the downlink transmission, or a first slot for PUCCH transmission comprising the downlink transmission.

* * * * *